(12) United States Patent
McKaughan et al.

(10) Patent No.: US 8,139,205 B2
(45) Date of Patent: Mar. 20, 2012

(54) OPTICAL PAYLOAD WITH INTEGRATED LASER RANGEFINDER AND TARGET DESIGNATOR

(75) Inventors: Stephen V. McKaughan, Arlington, MA (US); Philip A. Rombult, Boxford, MA (US); Robert J. Campbell, Jr., Manchester, NH (US)

(73) Assignee: Flir Systems, Inc., Wilsonville, OR (US)

( * ) Notice: Subject to any disclaimer, the term of this patent is extended or adjusted under 35 U.S.C. 154(b) by 374 days.

(21) Appl. No.: 12/463,882

(22) Filed: May 11, 2009

(65) Prior Publication Data
US 2012/0038901 A1 Feb. 16, 2012

Related U.S. Application Data

(60) Provisional application No. 61/127,320, filed on May 12, 2008.

(51) Int. Cl.
G01C 3/08 (2006.01)
(52) U.S. Cl. ...... 356/5.01; 356/3.01; 356/3.1; 356/4.01; 356/4.1; 356/5.1
(58) Field of Classification Search ......... 356/3.01–28.5
See application file for complete search history.

(56) References Cited

U.S. PATENT DOCUMENTS

| | | | |
|---|---|---|---|
| 5,005,083 A | 4/1991 | Grage et al. | |
| 5,274,236 A | 12/1993 | Pascale | |
| 5,336,900 A | 8/1994 | Peters | |
| 5,363,235 A | 11/1994 | Kiunke et al. | |
| 5,918,305 A | 6/1999 | Livingston | |
| 5,936,771 A | 8/1999 | Cooper | |
| 6,020,994 A | 2/2000 | Cook | |
| 6,226,125 B1 | 5/2001 | Levy et al. | |
| 6,359,681 B1 | 3/2002 | Housand et al. | |
| 6,396,961 B1 | 5/2002 | Wilson et al. | |
| 6,410,897 B1 | 6/2002 | O'Neill | |
| 6,765,663 B2 | 7/2004 | Byren et al. | |
| 6,903,343 B2 | 6/2005 | Amon et al. | |
| 6,925,382 B2 | 8/2005 | Lahn | |
| 6,969,176 B2 | 11/2005 | Pohle | |
| 7,499,829 B2 | 3/2009 | Lee et al. | |
| 7,505,119 B2 | 3/2009 | Rogers | |
| 2006/0232761 A1* | 10/2006 | McConville et al. | 356/5.1 |
| 2008/0186568 A1* | 8/2008 | Chen et al. | 359/399 |

OTHER PUBLICATIONS

L3 Communications Laser Designator Rangefinder Product Description.

* cited by examiner

*Primary Examiner* — Thomas Tarcza
*Assistant Examiner* — Luke Ratcliffe
(74) *Attorney, Agent, or Firm* — Haynes and Boone, LLP

(57) ABSTRACT

A compact optical payload for an unmanned aircraft includes two infrared cameras for wide and narrow field viewing, a daylight color camera, a laser pointer and a laser range finder.

21 Claims, 14 Drawing Sheets

PRIMARY CAMERA

SECONDARY CAMERA

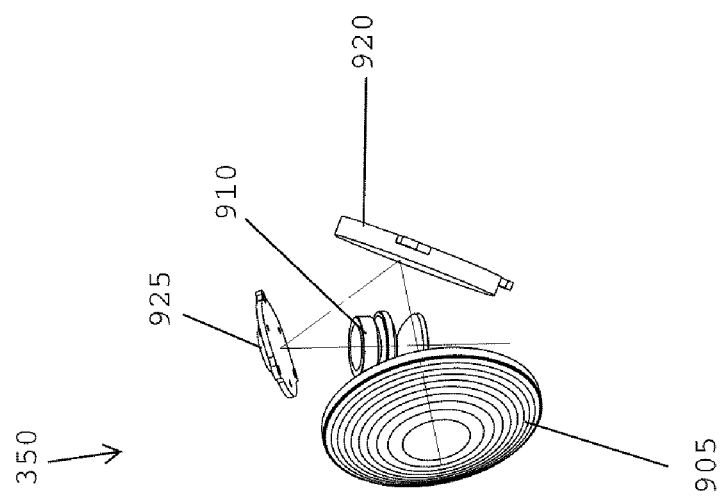
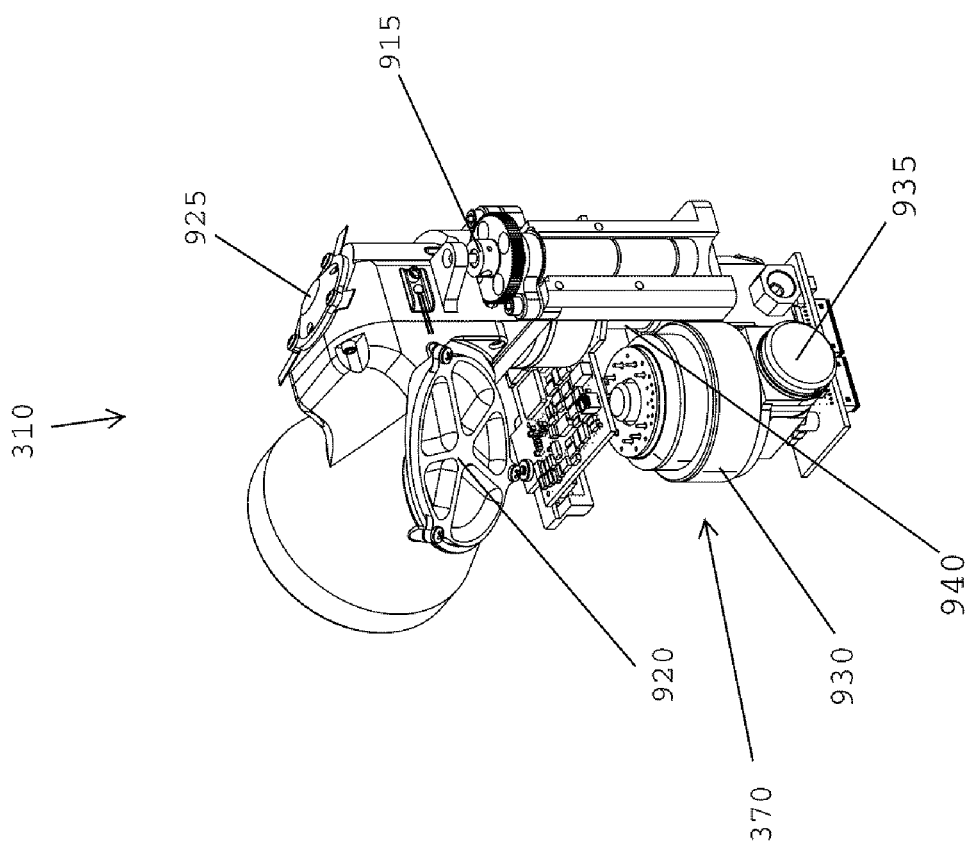

OPTICAL PAYLOAD WITH INTEGRATED LASER RANGEFINDER AND TARGET DESIGNATOR

CROSS REFERENCE TO PRIOR APPLICATIONS

This application claims priority under 35 U.S.C. 119(e) to Provisional Application Ser. No. 61/127,320 by McKaughan et al, filed on May 12, 2008, which is incorporated herein by reference in its entirety.

STATEMENT REGARDING FEDERALLY SPONSORED RESEARCH OR DEVELOPMENT

This invention was made with government support under U.S. Army contract no. W15P7T-04-C-K447. The Government of the United States of America may have certain rights to this invention.

BACKGROUND OF THE INVENTION

1. Field of the Invention

The present invention relates to an optical payload configured to be carried by an Unmanned Airborne Vehicle (UAV) conforming to Class II UAV standards. In particular, the payload includes two or more video cameras and electrical systems suitable for combining video images from two cameras into a single network packeted data stream. A primary video camera includes a folded telescope and a folded cryocooler to reduce a volume footprint of the optical payload. A laser rangefinder and laser target designator share a large aperture telescopic lens system to further reduce a volume footprint of the optical payload. A hollow cylindrical yoke assembly houses circular PC boards to further reduce a volume footprint of the optical payload.

2. Description of the Related Art

Optical payloads for airborne reconnaissance are described in the patent literature. One example system is disclosed in U.S. Pat. No. 5,005,083 by Grage et al. which describes a dual channel camera having wide and narrow fields of view and electrical systems suitable for tracking a target and for combining full image information from both fields of view in a single picture using a mixing device. However, Grage et al. is silent as to whether the two cameras have different spectral ranges, as to the specific camera or pointing platform designs, or as to whether the system includes an incorporated laser range finder or laser target designator.

Another optical payload system is disclosed in U.S. Pat. No. 6,410,987 by O'Neil which describes a video imaging system that includes wide and narrow field of view lens systems each forming an image of a target area onto the same infrared sensitive focal plane array. The system includes a movable mirror disposed to direct either the wide field of view or the narrow field image of the target area onto the infrared sensitive focal plane array, but not both. The infrared sensor is a two-color sensor having two regions with a first region sensitive to a first infrared wavelength range and a second region sensitive to a second infrared wavelength range. The system includes a dichroic beam splitter disposed between the movable mirror and the two-color focal plane array for dividing the image of the target area into two color images. The dichroic beam splitter splits the image of the target image area into two color images and directs a first color image onto the first focal plane array region sensitive to the first infrared wavelength range and directs the second color image onto the second focal plane array region sensitive to the second infrared wavelength range. However, O'Neil does not teach an optical payload that utilizes a plurality of focal plane arrays with different spectral sensitivity ranges or an optical payload that is capable of rendering and simultaneously displaying video images of the target area over two different fields of view and over two different spectral ranges.

One example of an optical payload that incorporates a laser rangefinder and a laser target designator and uses a single large aperture optical system to perform multiple tasks is described in U.S. Pat. No. 6,903,343 by Amon et al. which describes a payload having a wide field of view small aperture optical system and a narrow field of view large aperture optical system wherein the large aperture optical system is used to collect energy from a target area to provide a narrow field of view image of a target area focused on a first detector, and an image of a laser designator spot formed on the target area also focused onto a first detector. However, the Amon et al. disclosure does not teach incorporating laser range finder and laser target designator emitters into the optical payload.

There is a need to reduce the size and weight of camera systems used on Unmanned Airborne Vehicle (UAV). More generally, there is a need to further integrate optical payloads to provide increased functionality, reduced weight and improved aerodynamic performance without sacrificing image quality or decreasing the useful range of the device. It is also useful to allow a user to view two images simultaneously such as a low magnification image of the target area to provide situational awareness and a high magnification image of a selected target within the target area. Moreover UAV payloads may require a visible camera to provide color day image in daylight so that target areas are more recognizable to a remote operator. This is not usually required in a manned aircraft since the aviators are able to see the target area in daylight. the present invention remedies the problems encountered in the prior art.

BRIEF SUMMARY OF THE INVENTION

An embodiment of the present invention is directed to an optical payload comprising a laser rangefinder transmitter module and a laser target designator module. The laser rangefinder transmitter module comprises a rangefinder laser for emitting a pulsed laser rangefinder beam and a small aperture telescopic lens system configured to substantially collimate and point the laser rangefinder beam at a target area. The laser target designator module comprises a designator laser for emitting a pulsed laser target designator beam, a large aperture telescopic lens system configured to substantially collimate and point the designator beam at the target area, a laser rangefinder receiver module, first optical elements disposed along a first optical path between the large aperture telescopic lens system and the designator laser for directing the pulsed laser target designator beam from the designator laser to the large aperture telescopic lens system. The inventive optical payload further comprises second optical elements disposed along a second optical path between the large aperture telescopic lens system and the laser rangefinder receiver module for directing energy of the pulsed laser rangefinder beam reflected by the target area and collected by the large aperture telescopic lens system onto the laser rangefinder receiver module.

Another embodiment of the present invention is directed to a method for operating an optical payload. The inventive method comprises the steps of: (i) emitting a pulsed laser rangefinder beam from a laser rangefinder transmitter module; (ii) collimating the pulsed laser rangefinder beam and directing the collimated pulsed laser rangefinder beam onto a target area using a small aperture telescopic lens system attached to the laser rangefinder transmitter module; (iii) collecting energy of the collimated pulsed laser rangefinder beam reflected by the target area using a large aperture telescopic lens system and (iv) directing energy collected thereby onto a laser rangefinder receiver module. The large aperture telescopic lens system and laser rangefinder receiver module are housed in a laser target designator module, the laser rangefinder transmitter module and the laser target designator module are mechanically independent modules.

BRIEF DESCRIPTION OF THE DRAWINGS

The features of the present invention will best be understood from a detailed description of the invention and a preferred embodiment thereof selected for the purposes of illustration and shown in the accompanying drawing in which:

FIG. 13 depicts a rear isometric view of a primary video camera that includes a folded large aperture telescopic lens system and a folded cryocooler for cooling a primary focal plane array according to the present invention.

FIG. 14 depicts an optical schematic view of a folded large aperture telescopic lens system according to the present invention.

DETAILED DESCRIPTION OF THE INVENTION

Figure 1:
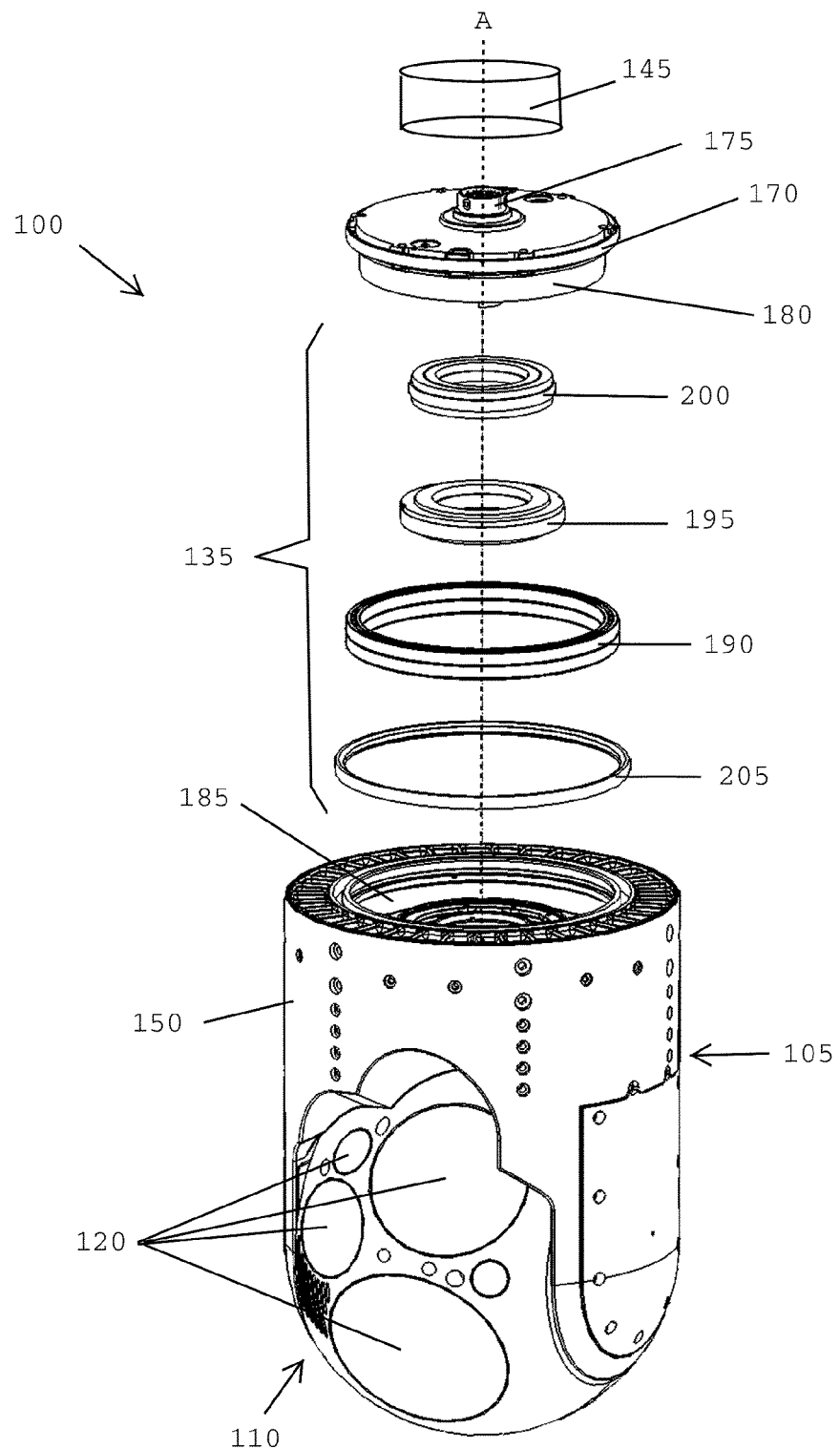
FIG. 1 is an exploded isometric view depicting elements of an optical payload according to the present invention.
Figure 2:
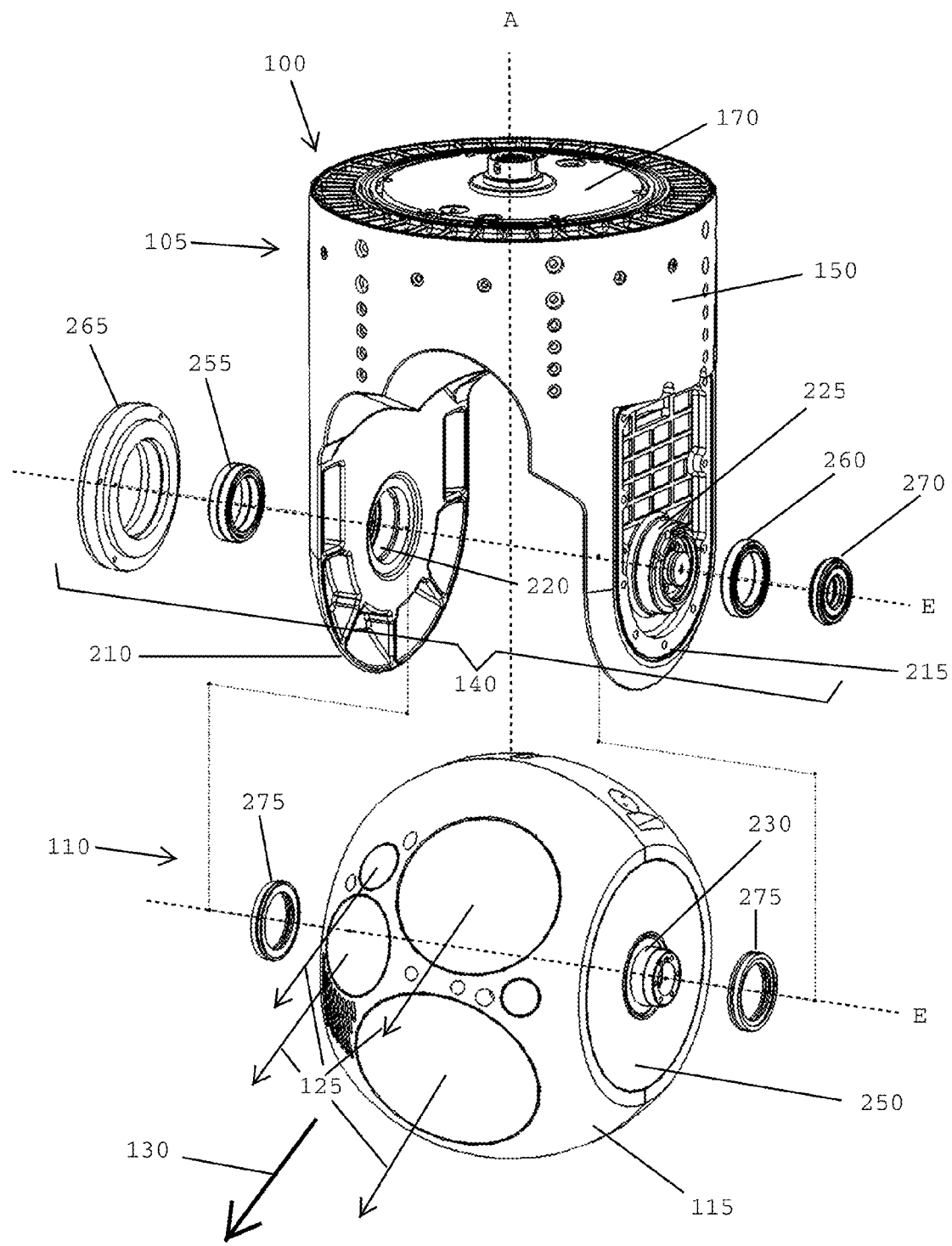
FIG. 2 is an exploded isometric view depicting further elements of an optical payload according to the present invention.

Referring to FIGS. 1-5 and 10 an optical payload 100 is shown in various views. FIGS. 1 and 2 depict exploded external isometric views of the optical payload 100 which includes a yoke assembly 105, configured to rotate about an azimuth axis A, and a spherical payload assembly 110, supported by the yoke assembly 105 and configured to rotate about an elevation axis E. The spherical payload assembly 110 comprises an optical bench assembly 300, shown in FIGS. 3-5, housed within a spherical housing 115. The spherical housing 115 includes optical apertures passing therethrough and aperture windows 120 installed within each optical aperture.

The optical bench assembly 300 includes a plurality of optical systems, detailed below, for collecting or emitting radiation through aperture windows 120. Each optical system collects or emits radiation over a field of view defined by a solid angle centered by a central ray or window pointing axis 125. Some or all of the window pointing axes 125 may be co-aligned along a common or primary pointing axis 130.

Referring to FIGS. 1-2 and 8-9, the optical payload 100 includes a primary drive system that includes a first or azimuth drive and rotary joint assembly, generally referred to by reference numeral 135, and a second or elevation drive and rotary joint assembly, generally referred to by reference numeral 140. The primary drive system operates to point the primary pointing axis 130 at a target area of interest. The primary drive system, collectively 600, includes separate and independent servo controllers for separately controlling the azimuth drive and joint assembly 135 and the elevation drive and joint assembly 140.

The primary drive system 600 is operable in various modes such as a "search mode" to continuously scan the primary pointing axis 130 over a region, a "manual mode" wherein a remote user can point the primary pointing axis 130 manually using a joy stick or the like, in a "scene tracking mode" wherein the primary pointing axis 130 tracks a moving target, in a "geo-pointing mode" wherein the primary pointing axis 130 is continuously pointed at specific geographic coordinates, and may operate in other pointing modes.

The azimuth drive and rotary joint assembly 135 is installed within the yoke assembly to rotate the yoke assembly 105 and the attached spherical payload assembly 110 about a substantially vertical azimuth axis A. The elevation drive and rotary joint assembly 140 is disposed between the yoke assembly 105 and the spherical payload assembly 110 and serves to rotate the spherical payload 110 about a substantially horizontal elevation axis E. The spherical payload 110 rotates with respect to the yoke assembly 105 and with respect to a support structure 145. Each of the rotary joints and drives is capable of 360 degree rotation, however, in some orientations the aperture windows are vignetted by the yoke assembly 105.

The optical payload 100 is attached to the support structure 145, and the primary drive system 600, using the azimuth and the elevation drives, rotates the yoke assembly 105 and the spherical payload 110 to point the primary pointing axis 130 at a scene of interest. The optical payload 100 includes an electrical power source and power distribution systems, optical systems, electrical control and feedback systems, and communications systems as required to point the primary pointing axis 130 at a target area, to render video images of the target area and to transmit the video images to a remote station for display and viewing by a user. In particular, the optical payload 100 is configured to simultaneously transmit two video images of the scene of interest with each video image being rendered over a different spectral range. Moreover, the communications systems may receive user generated operating commands from the remote station to control various modes of operation of the optical payload 100.

In a preferred embodiment, the support structure 145 comprises an airborne vehicle and especially an Unmanned Airborne Vehicle (UAV) conforming to Class II UAV standards. Accordingly, the preferred optical payload 100 is constructed with weight, volumetric footprint, and aerodynamic drag properties suitably optimized for being carried as a payload on a Class II UAV. In particular, the preferred optical payload 100, excluding the support structure 145, has a design weight of less than 16 pounds and the preferred spherical payload assembly 110 has a spherical diameter of less than 190.0 mm and with the present example having a spherical diameter of 184.0 mm, (7.25 inches).

Referring now to FIGS. 1, 2 10, 12 and 15A-B, the yoke assembly 105 comprises a cylindrical top section 150 formed by a thin annular wall 155 surrounding a hollow electronics cavity 160. The hollow electronics cavity 160 houses a plurality of circular printed circuit boards, (PCB's), (750, 755, 760, 765), shown in FIGS. 10 and 11, populated with surface mounted digital and analog electrical components, electrical connectors, forming subsystems for video processing, motor and servo control, target tracking, gyro stabilization, communications, camera operation, and the like. The hollow electronics cavity 160 also includes an upper bracket 165 that installs into a top circular opening of the cylindrical top section 150 and is attached to the thin annular wall 155 for sealing the hollow electronics cavity 160, for providing structural stiffness to the top end of the annular wall 155 and for supporting a rotary interface with an azimuth hub 170.

The yoke assembly 105 includes a disk shaped azimuth hub 170 that mechanically attaches to a support structure 145 and includes mounting features, not shown, for orienting the payload assembly primary pointing axis 130 with respect to the support structure 145. The azimuth hub further includes an electrical connector 175 extending upward from the mounting flange to connect electrical systems housed in the payload assembly 100 with an electrical system carried by the support structure and especially to communicate with a radio 705 shown in FIGS. 12 and 15B. The azimuth hub 170 includes an external seal diameter 180 sized to mate with the upper bracket 165 at a corresponding internal seal diameter 185 thereof. The azimuth hub 170 is fixedly attached to the support structure 145 by the azimuth hub 170 and the upper bracket 165 is fixedly attached to the cylindrical top section 150 through the thin annular wall 155 The azimuth drive and rotary joint 135 form a rotary joint disposed between the azimuth hub 170 and the upper bracket 165. In particular, the azimuth drive and rotary joint 135 includes a rotary bearing, such as a duplex bearing set 190, for providing a rotary joint between the upper bracket 165 and the azimuth hub 170.

The azimuth drive includes an azimuth drive motor 195, such as a flat or pancake style motor, and a first rotary position resolver 200 suitable for sensing a rotary position or rotation angle. The rotary position resolver 200 may comprise an optical encoder, Hall Effect sensors, or other suitable rotary angle position transducer. In addition, the azimuth drive and rotary joint assembly 135 includes a cavity seal 205 disposed between the seal diameters 180 and 185 for sealing the hollow electronics cavity 160 from moisture and contamination. Alternately, the cavity seal 205 may be configured as a pressure seal and the hollow electronics cavity may be filled with a pressurized gas or may be evacuated to a vacuum pressure.

The yoke assembly 105 includes opposing left and right yoke arms 210, 215 extending downwardly from the top section 150. Each yoke arm 210, 215 includes a hub support feature 220, 225 such as a through or blind bore, formed coaxial with the elevation axis E. The hub support features 220, 225 mate with opposing left and right cylindrical mounting hubs 230, (only the right hub mounting feature is shown), that extend out from the payload assembly 110. Referring now to FIGS. 2-6 and 10, the payload assembly 110 comprises a substantially spherical outer housing 115 sized to enclose an optical bench assembly 300, shown in front isometric view in FIG. 3 and in rear isometric view in FIG. 4. The spherical housing 115 comprises a front section 235 that includes the apertures and optical windows 120 and a rear section 240 that mates with the front section 235. In addition, a pair of opposing left and right disk-shaped side sections, 250, only one is shown in FIG. 2, are formed to mate with the front section 235 and rear section 240 to enclose and seal the optical bench assembly 300 from moisture and contaminates. Accordingly, mating surfaces of the front section 235, the rear section 240 and the left and right disk-shaped side sections 250 may be sealed by gaskets or other sealing elements or compounds applied thereon at assembly.

Preferably the yoke assembly top section 150 and left and right yoke arms 210, 215 comprise a unitary machined part to increase stiffness and to meet stringent tolerance required. However, other embodiments such as a metal casting or composite structure may be used. The spherical housing front and rear sections 235 and 240 preferably comprise metal castings while the left and right side section 250 are preferably machined parts, however other embodiments are usable without deviating from the present invention. Additionally, any metal casting may be further modified by machining and other metal-forming steps to fabricate machined features such as holes, precision mating surfaces, bearing journals and other features as may be required. In particular, the metal castings are formed with thin walls using lightweight, high-stiffness materials comprising aluminum and/or titanium or other metals as required to reduce part weight without compromising structural integrity. Alternately, some or all of the cast elements may comprise cast or molded plastic materials such as polycarbonate, or the like, or may comprise composite materials such as wound carbon or glass fibers, in a base of epoxy and or other bonding agents.

The disk-shaped side sections 250 support the left and right mounting hubs 230 and define the elevation axis E on the optical bench assembly 300. The elevation drive and rotary joint 140 includes opposing left and right bearings 255, 260 disposed between the left and right mounting hubs 230, only one shown, and the left and right hub support features 220, 225 for providing a rotary joint between the yoke arms 210, 215 and the spherical payload assembly 110. The left bearing 255 may comprise a duplex bearing set to reduce longitudinal and axial play in the rotary joint.

Figure 10:
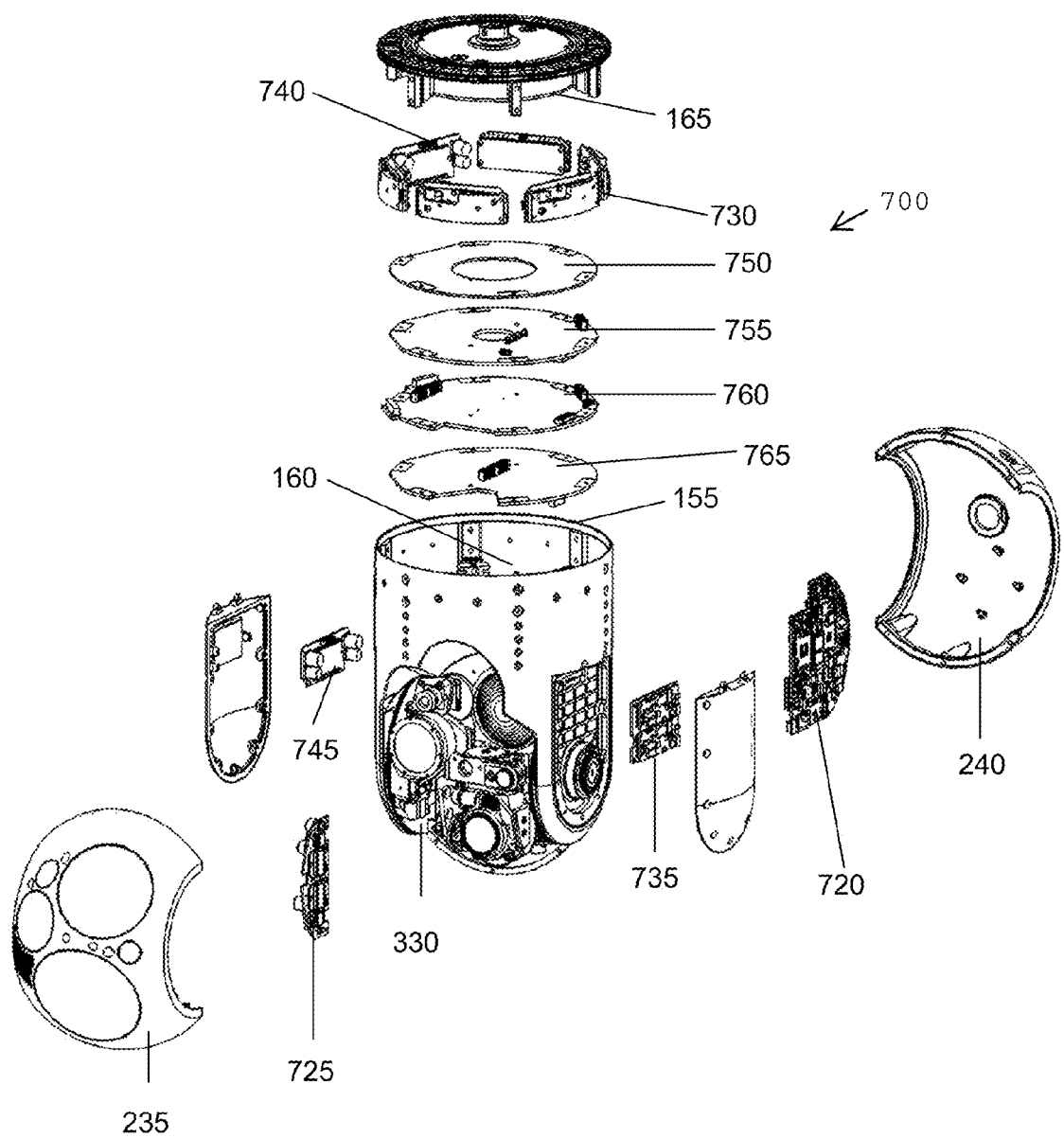
FIG. 10 is an exploded isometric view depicting electrical subsystems of an optical payload according to the present invention.
Figure 15A:
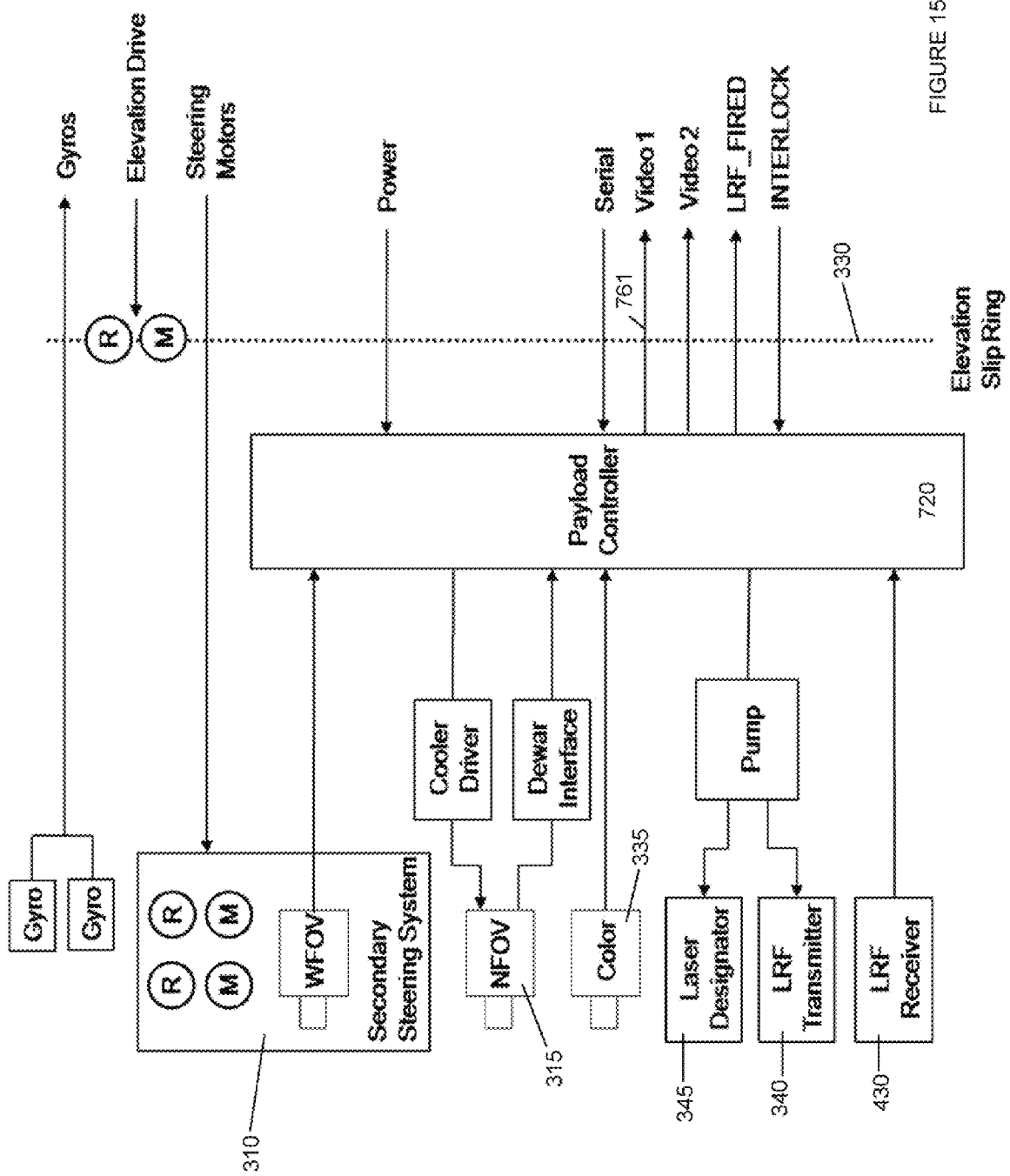
FIGS. 15A and 15B depict schematic views of an optical payload electrical system according to the present invention.
Figure 15B:
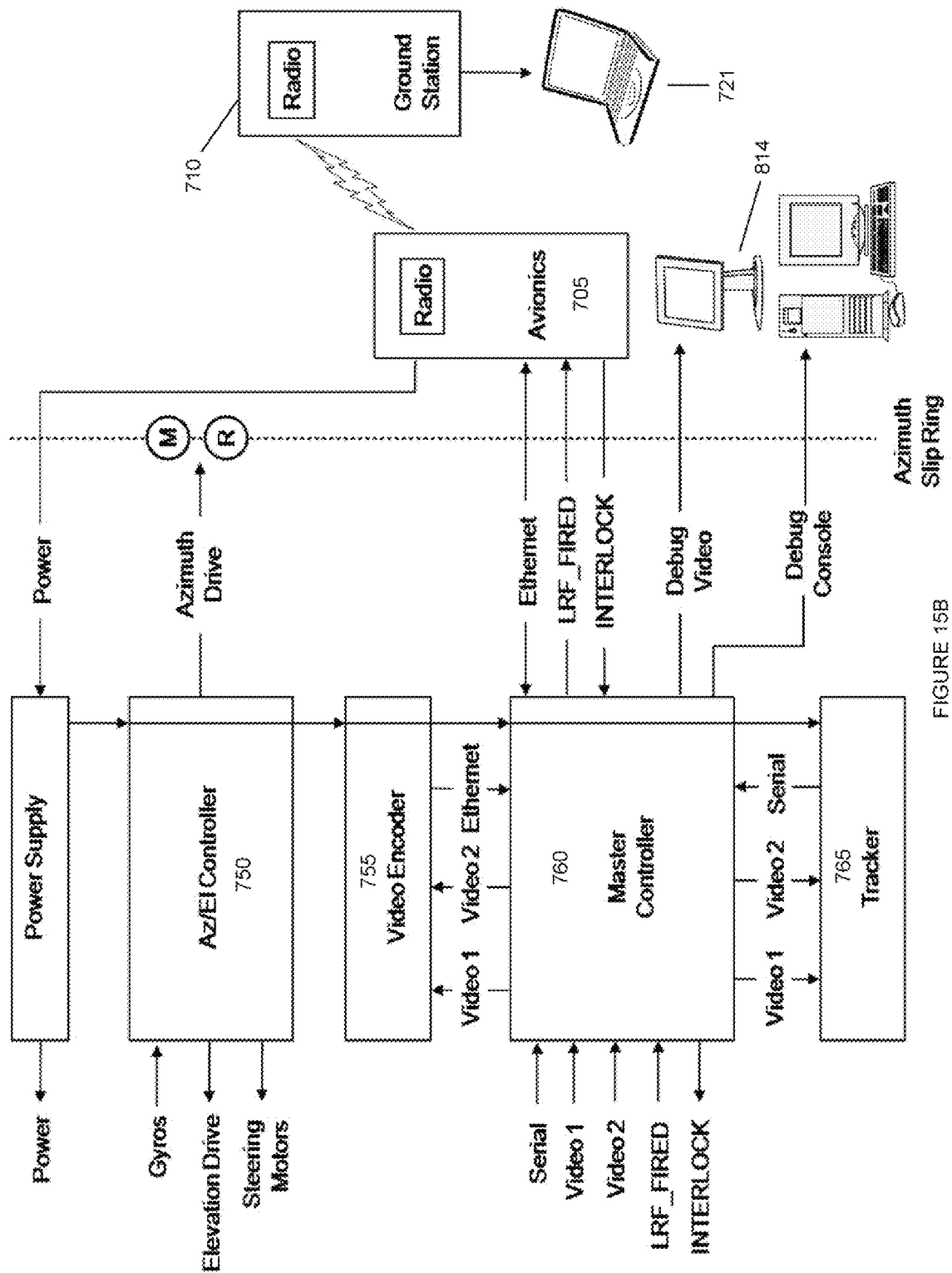

A rotary elevation drive motor 265, such as a flat or pancake style motor, attaches to the left yoke arm 210 and the left mounting hub, not shown, to provide a rotary drive force for rotating the payload assembly 110 about the elevation axis E and with respect to the yoke assembly 105 and support structure 145. A second rotary position resolver 270 suitable sensing rotary position or rotation angle, such as an optical encoder, Hall effect sensors or other suitable angular position transducer, interfaces with the right mounting hub 230 and the right hub support feature 225 to provide an electrical signal in proposition to the angular position of the spherical payload assembly 110 with respect to a reference angular position or orientation. A pair of cavity seals 275 are disposed over the left and right mounting hubs 230 between the disk-shaped side sections 250 and the left and right hub support features 220, 225 to seal the spherical housing 115 and the elevation drive and rotary joint 145 from contaminates and moisture. It is a particularly advantageous feature of each of the azimuth and elevation drives of the present invention that both drives are rotatable over a full 360 degree angle. This is in part due to the construction of conductive slip rings 330 for exchanging electrical signals including electrical power signals between electrical systems housed inside the hollow cavity 160 and electrical systems housed inside the spherical housing 115. The slip rings are shown in FIG. 10 disposed between the yoke arm 210 and the optical bench assembly 300. The slip rings 330 include a first conductive ring fixedly attached to the yoke assembly 105 and a second conductive ring fixedly attached to the payload assembly 110. The first and second rings remain in electrical contact with each other as the payload assembly 110 rotates about the elevation axis E with respect to the yoke assembly 105. As shown in FIGS. 15A-B, power and electrical signals pass from electrical systems housed in the yoke assembly 105 through the slip rings 330 to the payload controller 720, which is housed in the payload assembly 110 and in electrical communication with electrical elements of the optical payload. Similarly, electrical signals including video data pass from electrical elements of the optical payload to the payload controller 720 through the slip rings 330 to electrical systems housed in the yoke assembly 105.

Optical Bench Assembly

Figure 3:
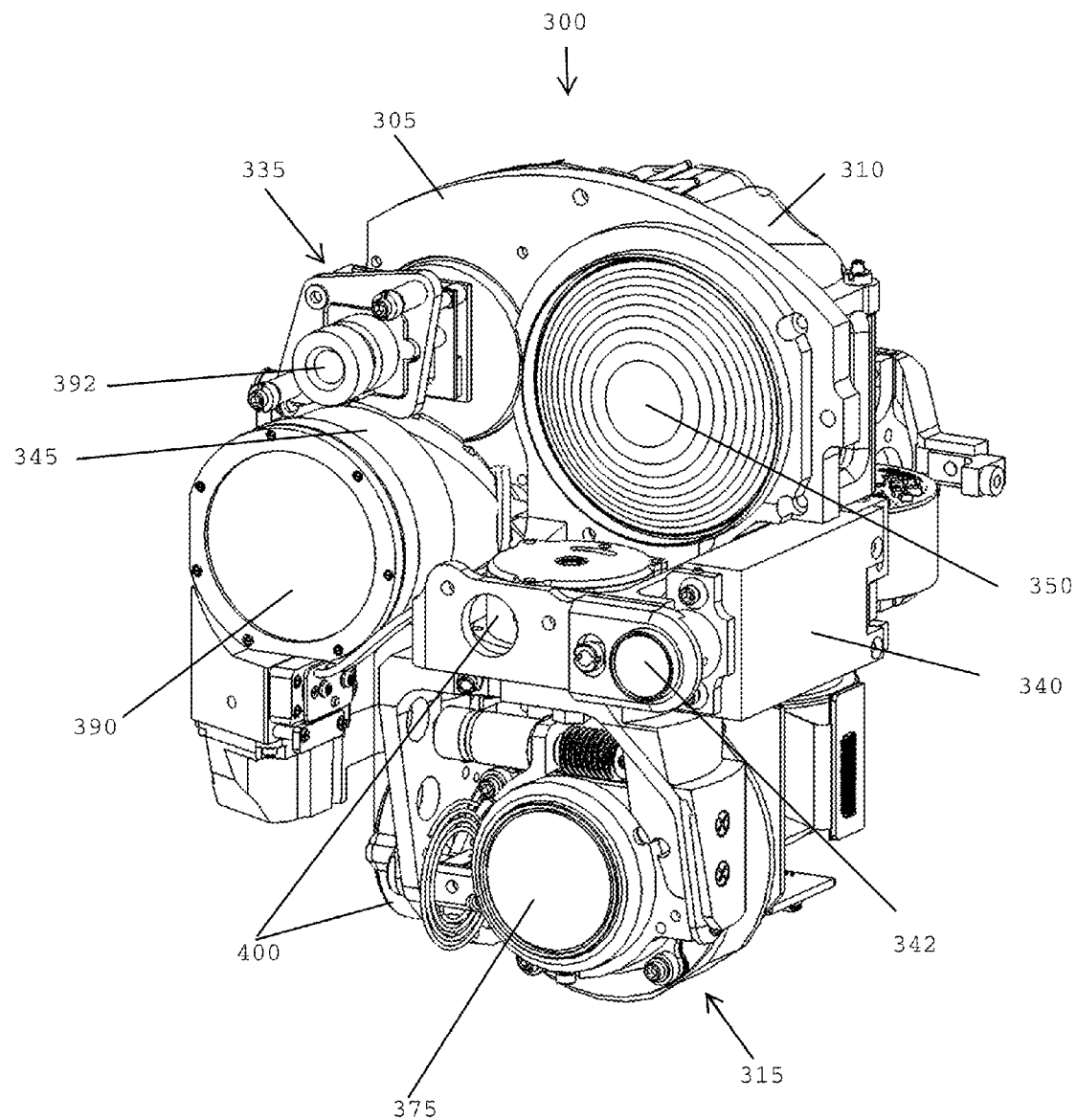
FIG. 3 is a front isometric view depicting an optical bench assembly according to the present invention.
Figure 4:
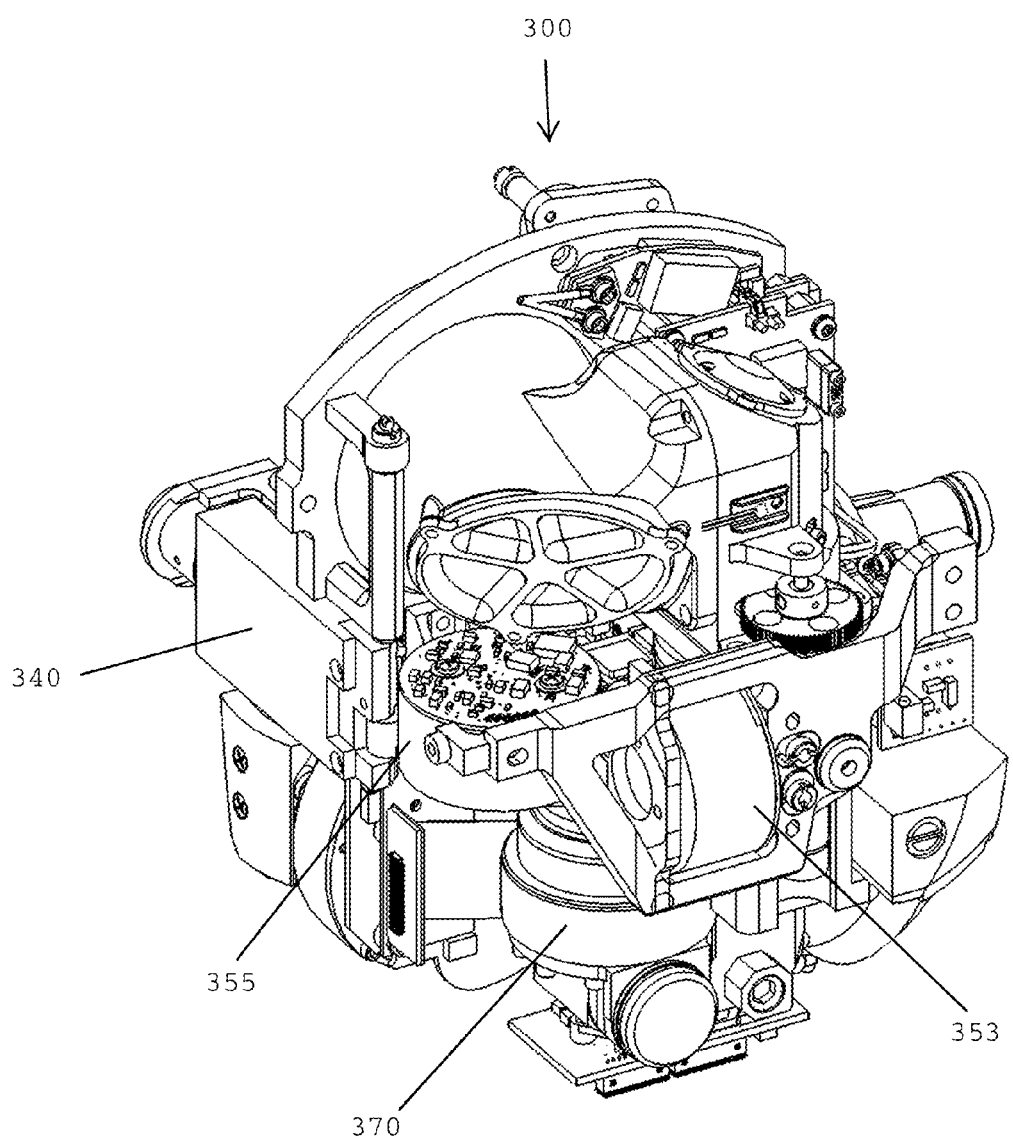
FIG. 4 is a rear isometric view depicting an optical bench assembly according to the present invention.

Referring now to FIGS. 3-9, the optical bench assembly 300 is shown in a front isometric view in FIG. 3 and in a back isometric view in FIG. 4. The optical bench assembly 300 installs inside the spherical housing 115 and comprises a rigid optical bench 305 configured to structurally support a plurality of optical systems thereon. Preferably the optical bench 305 comprises a metal casting, or the like, formed with cast structural sections machined to add features such as holes and precision interface surfaces usable as attaching and locating features for optical systems. A primary video camera 310 attaches directly to the optical bench 305. The primary video camera 310 is configured to render a video image of a primary target area 320 shown in FIG. 8, over a mid-infrared spectral range and a central ray of the primary camera field of view defines the primary pointing axis 130.

Figure 6:
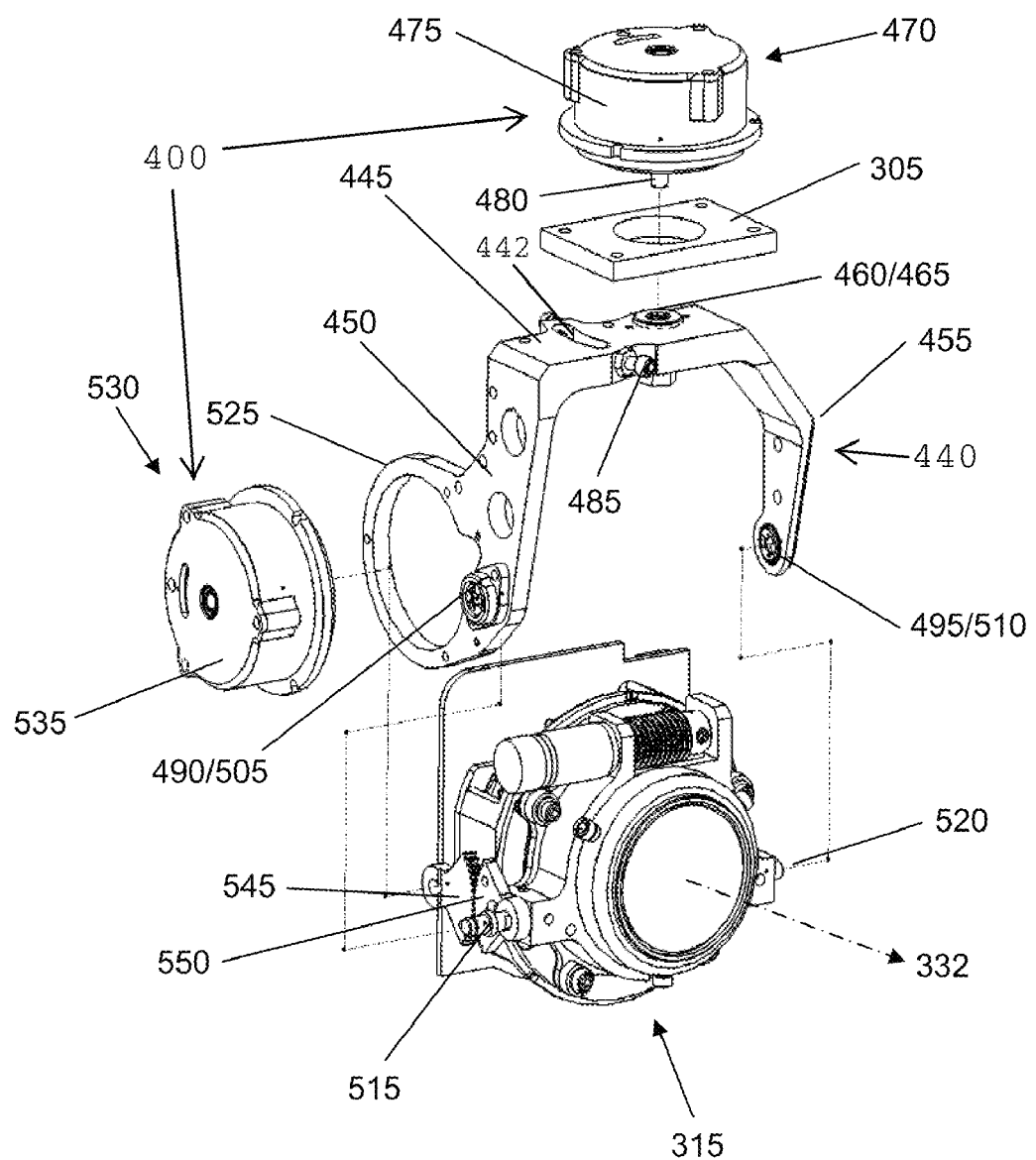
FIG. 6 is an exploded isometric view depicting a secondary drive and secondary camera according to the present invention.

A secondary video camera 315 is mounted on a secondary drive system 400, shown in detail in FIG. 6. The secondary drive system 400 is rigidly attached to the optical bench 305 and configured to movably support the secondary video camera 315 for rotation with respect to the optical bench 305 about two rotational axes. The secondary video camera 315 is configured to generate a video image of a target area 325 shown in FIG. 9, over a long-infrared spectral range and a central ray of the secondary camera field of view defines a secondary pointing axis 332.

The preferred optical bench assembly 300 includes a third video camera 335, a laser range finder transmitter module 340 and small aperture telescopic lens system 342 for collimating a laser transmitter beam, a laser target designator module 345 and associated large aperture telescopic lens system 390 for collimating a laser designator beam. Each of the third video camera 335, laser rangefinder transmitter module 340 and laser target designator module 345 have a field of view and an individual pointing axis 125, which is preferably aligned or bore sighted coaxially with the primary pointing axis 130. Preferably the third video camera 335 is configured to generate a video image of the secondary target area 325 shown in FIG. 9, over a visible spectral range.

Figure 5:
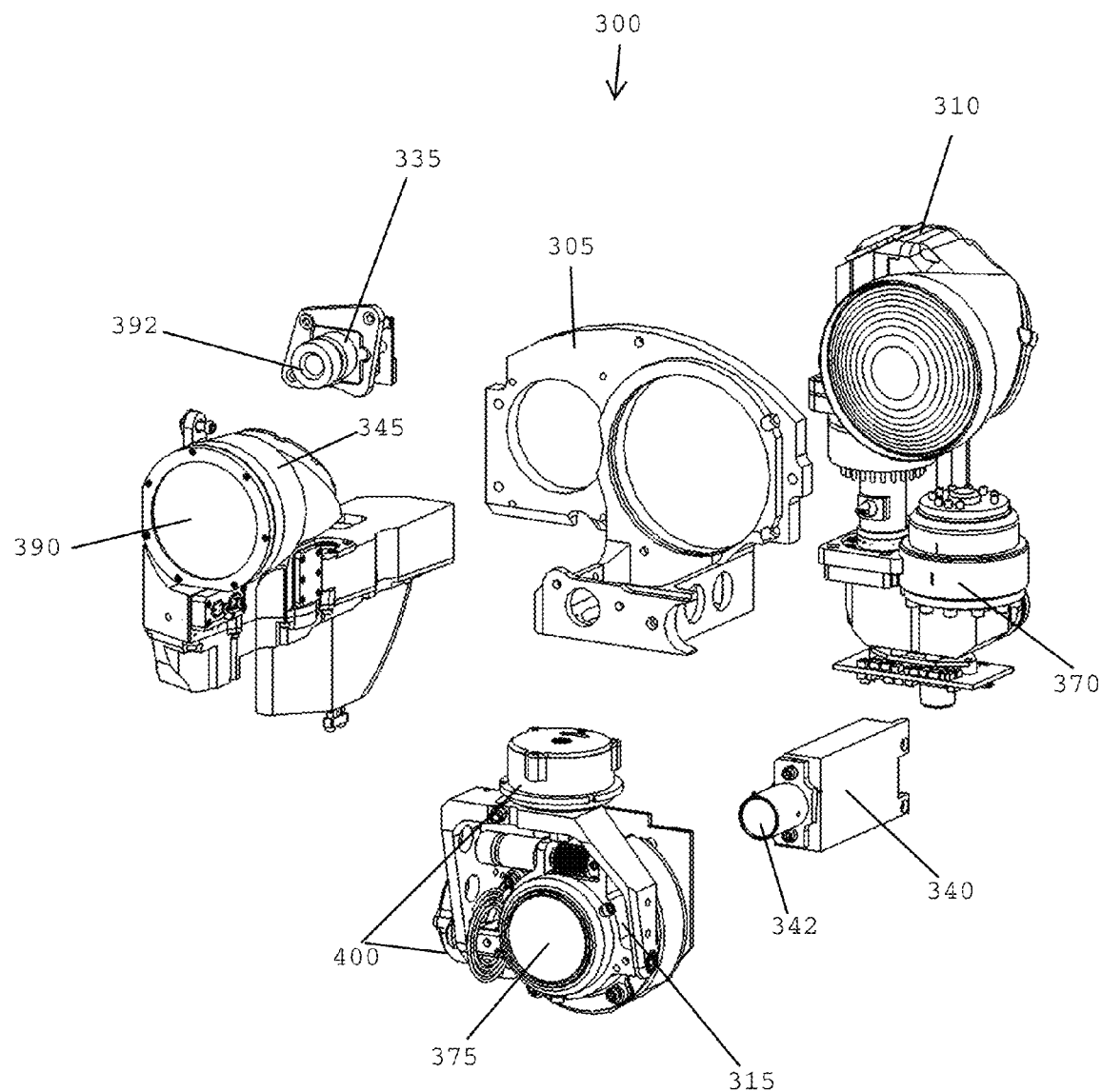
FIG. 5 is an exploded isometric view of an optical bench assembly according to the present invention.
Figure 8:
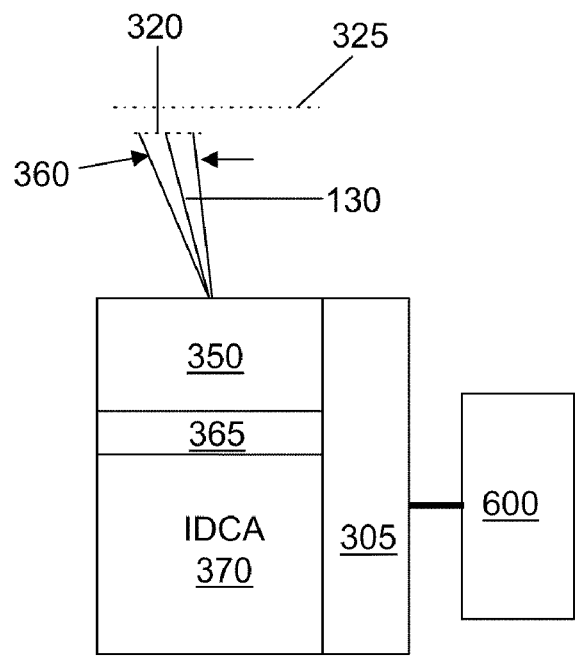
FIG. 8 is a schematic plan view depicting a primary video camera for rendering an image of a target area according to the present invention.
Figure 9:
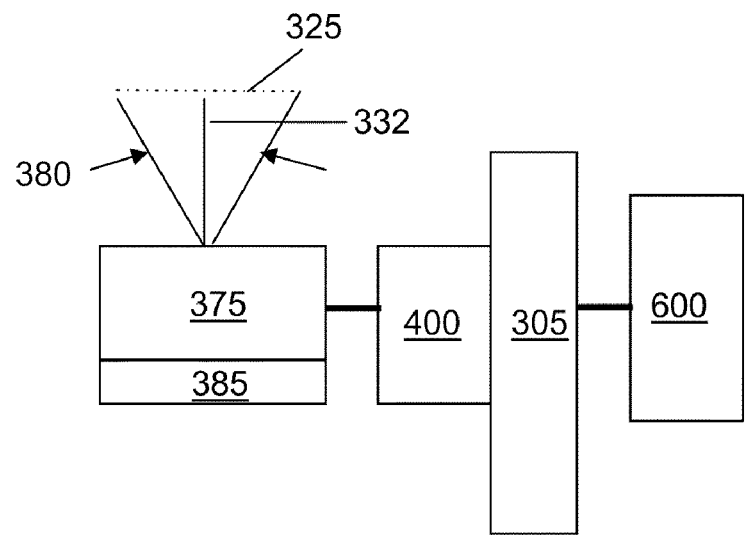
FIG. 9 is a schematic plan view depicting a secondary video camera for rendering an image of a scene area according to the present invention.

Referring now to FIGS. 8 and 9, the primary video camera 310 comprises a high resolution, narrow field of view, (NFOV) video camera usable to render a mid-range infrared image of a primary target area 320 within a larger target area 325. More specifically, the primary video camera 310 is configured to render a magnified image of a portion of the target area 325 and the magnified image has sufficient optical resolution to identify a primary target from a specific range. The primary video camera 310 includes a primary telescopic lens system 350 having an effective focal length of approximately 200 mm and a stop aperture, or the like, defining the NFOV, e.g. approximately encompassing a solid angle of 2.7 degrees horizontal, 360, by 2.0 degree vertical. The central ray of the NFOV may define the primary pointing axis 130. Alternately, the laser target designator beam 416 may define the primary pointing axis 130, in which case other elements of the optical payload are bore-sighted to co-align with the designator beam 416. The primary video camera 310 rigidly attaches to the optical bench 305 and is therefore pointed at a desired primary target area 320 by movement of the primary drive system 600. Referring now to FIGS. 5, 13 and 14, the primary telescopic lens system 350 is folded by two fold mirrors 920 and 925 each disposed at a compound angle with respect to the telescope optical axis. In addition, an integrated Dewar and cryogenic cooler module, (IDCA) 370 is coupled to the primary video camera 310 and supported by the optical bench 305. The IDCA 370 cools a primary focal plane array and other local support structure of the primary video camera to an operating temperature of approximately 77° K to reduce signal noise in the focal plane array. More specifically the IDCA 370 comprises a folded compact cryocooler design such as the one disclosed in co-pending and commonly assigned U.S. patent application Ser. No. 11/433,697, entitled COOLED INFRARED SENSOR ASSEMBLY WITH COMPACT CONFIGURATION, filed on May 12, 2006, the entirety of which is incorporated herein by reference. The cryocooler 370 comprises a rotary DC motor 930 driving a gas compressor. The gas compressor is housed in a crankcase 935. The rotary DC motor 930 is also connected to a regenerator piston 940 through a folded linkage that is also housed in the crankcase 935. Rotation of a shaft of the DC motor 930 is coupled to the regenerator piston 940 through the folded linkage which reciprocally drives the regenerator piston 940 along a linear axis that is substantially parallel with the rotation axis of the DC motor 930. Thus, the folded cryocooler design reduces its longitudinal length. According to the present invention, both the primary telescope 350 and the IDCA 370 are folded in order to reduce the volume foot print of the primary video camera 310 and more specifically, to reduce the spherical diameter of the payload assembly 110.

As shown in FIG. 14, the primary telescope 350 includes a large aperture objective lens 905 and a plurality of focus elements 910 with some of the focus elements being movable along the telescope optical axis to adjust the focal plane location of the lens system 350. The lens system 350 further includes a conventional automated lens actuator 915 configured to axially displace one or more of the focus elements 910 as required to adjust the position of a focal plane of the lens systems 350.

The primary video camera 310 includes a conventional focal plane array 365, shown schematically in FIG. 8, comprising a plurality of active image sensors disposed over an active area which is positioned in a focal plane of the primary telescopic lens system 350 such that the primary telescopic lens system 350 forms a focused image of the primary target area 320 that substantially fills the active area of the focal plane array 365. As stated above, at least one of the focus elements 910 is movable by an actuator to change the position of the lens system focal plane with respect to the position of the focal plane array 365. The primary video camera 310 may also include an automated shutter adjusting system for varying the stop aperture size or other characteristics of the primary video camera 310 in order to maintain irradiance levels at the primary focal plane array 365 to within usable limits.

The primary focal plane array 365 is configured to generate a photo current in response to mid-range infrared radiation falling thereon, e.g. radiation with a wavelength of 3-5 microns. More specifically, the primary focal plane array comprises an array of 640×480 indium antimonide (InSb) detector elements and the entire array and local support structure is cooled by the IDCA 370 to an operating temperature of approximately 77° K to reduce signal noise in the focal plane array.

Secondary Camera

The secondary video camera 315 comprises a wide field of view, (WFOV) video camera usable to render a long-range infrared image of the target area 325. More specifically, the secondary video camera 315 is configured to render an image of the target area 325 with sufficient optical resolution to detect the presence of a target from a specific range. The secondary video camera 315 includes a secondary telescopic lens system 375 having a fixed magnification and an effective focal length of approximately 25.0 mm and a stop aperture, or the like, defining the wide field of view, e.g. approximately encompassing a solid angle 380 of 35 degrees horizontally and a solid angle of 27 degrees vertically. The central ray of the WFOV defines the secondary pointing axis 332. The secondary drive system 400 is disposed between the optical bench 305 and the secondary video camera 315 for rotating the secondary video camera 315 with respect to the optical bench 305.

The secondary telescopic lens system 375 comprises a two germanium element fixed field of view lens system. A secondary focal plane array 385 shown in FIG. 9, comprising a plurality of active image sensors disposed over an active area and is positioned in a focal plane of the secondary telescopic lens system 375 such that the secondary telescopic lens system 375 forms a focused image of the target area 325 that fills the active area. The secondary video camera 315 may also include an automated shutter adjusting system for varying the stop aperture size in order to maintain irradiance levels at the secondary focal plane array within usable limits as well as for closing the shutter to perform a focal plane array response uniformity calibration.

The secondary focal plane array 385 is a microbolometer resistance change device configured to generate a photo current in response to long-range infrared radiation falling thereon, e.g. radiation with a wavelength of 8-12 microns. More specifically, the secondary focal plane array comprises an array of 640×480 silicon detector elements operating at ambient temperature.

Color Day Camera

The third video camera 335 comprises a visible wavelength video camera or color day camera usable to render a color image of the target area 325 in the visible spectrum, e.g. radiation with a wavelength range of 400-700 nanometers. The color day camera 335 includes a fixed magnification visible lens system 392 having an 8 mm effective focal length and a field of view approximately encompasses a solid angle 380 of 35 degrees horizontally and 27 vertically. The visible lens system 392 is a fixed focal length lens system and is positioned to form a substantially focused image of the target area 325 onto a color day focal plane array, not shown, such as a conventional visible color sensitive charged coupled device (CCD). The color day camera 335 also includes automated systems for varying its configuration and operating mode according to irradiance levels at the CCD in order to generate a useful image over a wide range of daylight light levels. In particular, the third video camera 335 may comprise a camera model 20K155DIG sold by VIDEOLOGY of Greenville R.I., USA, or a camera model KPC-520C sold by KT&C of Seoul, South Korea.

LR/D

Figure 7:
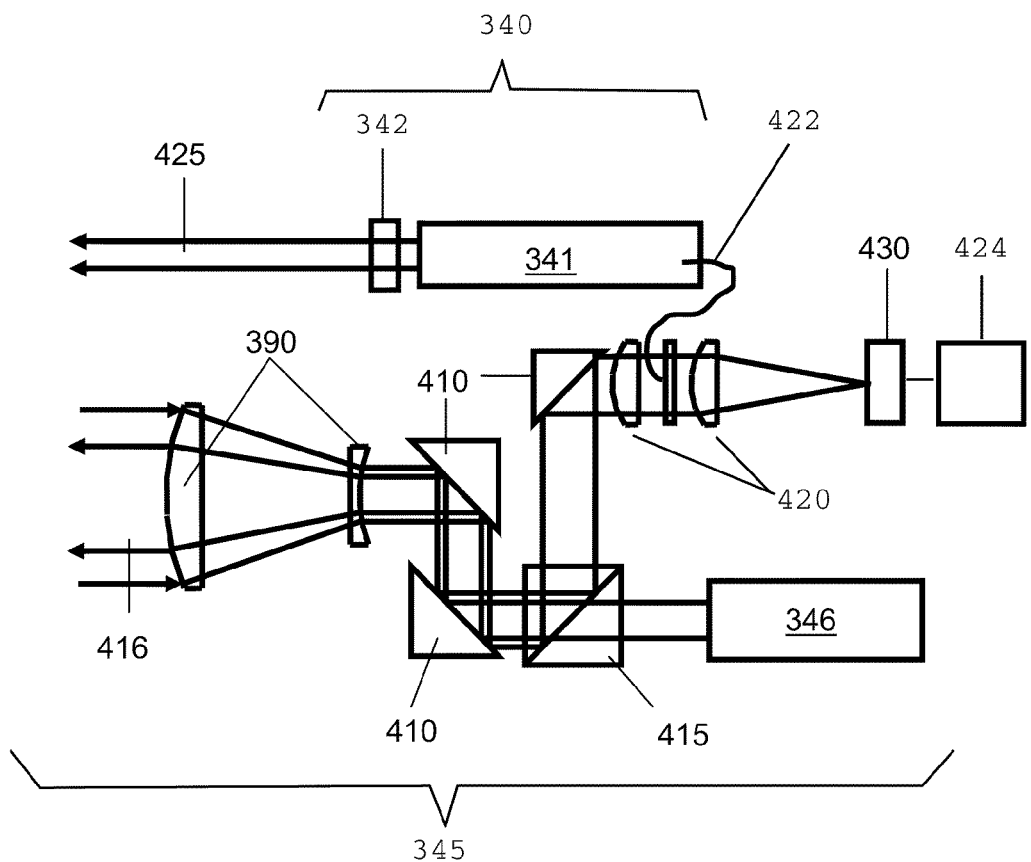
FIG. 7 is a schematic view depicting a combined laser rangefinder and laser target designator according to the present invention.

Referring now to FIGS. 3, 5 and 7, a laser rangefinder system comprises two elements separately disposed within the payload assembly. A first element comprises a laser rangefinder transmitter 340 for transmitting a laser rangefinder beam 425. A second element comprises a laser rangefinder receiver 430 disposed inside a laser designator module 345. The laser rangefinder receiver 430 is disposed inside the laser designator module 345 to utilize its large aperture telescopic lens system 390 which it shares with the designator laser 346.

The laser target designator module 345 comprises a designator laser 346 and laser pumping elements, not shown. Preferably, the designator laser 346 is configured as a pumped neodymium YAG solid state laser operating to emit radiation pulses at a radiation wavelength of approximately 1064 nanometers. Preferably the designator laser 346 generates pulses having a minimum duration of 10 nanoseconds modulated at a frequency of 10-20 pulses per second with a pulse energy of greater than 30 mJ. Preferably the designator laser 346 is pumped by a laser diode; however, other pumping sources such as flash lamps are usable. Pulses emitted by the designator laser 346 pass through a beam splitter 415 and are directed by mirrors 410 through the large aperture telescopic lens system 390 to generate a substantially collimated designator beam 416. Preferably the beam splitter 415 is a dichroic filter configured with a high spectral transmittance substantially centered at the output wavelength of the designator laser which is approximately centered at 1064 nanometers. In the present example embodiment, the laser target designator module 345 is fixedly mounted to the disk shaped side section 250. Optionally, the laser target designator module 345 may be mounted to the optical bench 305. In either case, the orientation of the laser target designator module 345 is adjusted to coaxially align a pointing axis of the designator beam 416 with the primary pointing axis 130. Alternately, the designator beam 416 may be used as the primary pointing axis 130 with other elements of the optical payload being boresighted to co-align with the designator beam 416. Accordingly, the laser designator beam 416 may be used to illuminate target areas being imaged by the primary video camera 310. The large aperture telescopic lens system 390 is configured with a large aperture, e.g. 50-90 mm, to produce a designator beam 416 having a large enough diameter to produce a desired low beam divergence angle while the designator laser 346 is designed with laser radiation energy output levels as required to illuminate a desired target size at a desired target range.

The laser rangefinder transmitter module 340 comprises a compact pulsed rangefinder laser 341 such as an Erbium (Er) glass laser pumped by a laser diode and operating to emit radiation pulses at an eye-safe radiation wavelength, i.e. a range of 1500 to 1800 nanometers. Preferably the laser 341 generates laser pulses having a wavelength approximately centered at 1535 nm with pulse durations ranging from 5 to 25 nanoseconds and with a pulse energy ranging from 2 to 8 mJ. The laser rangefinder transmitter module 340 further includes a small aperture telescopic lens system 342 suitable for generating a substantially collimated rangefinder beam 425. The rangefinder laser transmitter module 340 is fixedly attached to the optical bench 305 and adjusted to coaxially align a central ray of the collimated rangefinder beam 425 with the primary pointing axis 130 such that the laser rangefinder beam 425 is directed at the target area 320 and is pointed by the primary drive system 600.

After reflecting from a target area, a portion of the energy of the laser rangefinder beam 425 is reflected back to the optical payload 100 and collected by the large aperture telescopic lens system 390. The reflected energy is directed onto a laser rangefinder receiver module 430, by the mirrors 410 and the beam splitter 415. Accordingly the beam splitter dichroic filter is further configured with a high spectral reflectance substantially centered at the output wavelength of the rangefinder laser 341, which is approximately centered at 1535 nanometers. The collection optics further include a focusing lens set 420 that focuses the collected energy onto an active area of the rangefinder receiving module 430. The rangefinder receiving module 430 comprises a pin diode or the like, which generates a photocurrent in response to radiation falling thereon. The photocurrent is communicated to a signal process 424 for digital signal processing.

The combined laser rangefinder module 340 laser target designator module 345 further includes a fiber optic element 422 that extends between the rangefinder laser 341 and the laser target designator module 345. A first end of the fiber optic element 422 is disposed inside the rangefinder laser 341 at a location that couples a portion of the energy of each rangefinder laser output pulse into the first end of the fiber optic element 422. A second end of the fiber optic element 422 is disposed inside the laser target designator module 345 at a location that directs energy being emitted from the second end of the fiber optic element 422 onto receiver module 430 and particularly at the active area thereof. Accordingly, the fiber optic element 422 directs rangefinder laser output pulse energy onto the receiver module 430 and the photo diode generates a photocurrent responsive to each rangefinder laser output pulse. The photocurrent is communicated to a signal processor 424 for digital signal processing. The processor 424 is included on the payload controller 720.

Accordingly, the signal processor 424 processes first signals responsive to each output pulse of the rangefinder laser 341 and second signals responsive to each rangefinder laser pulse that is reflected back from the target area. Generally the signal processor 424 calculates a range from the target area to the optical payload 100 according to a temporal separation between output pulses of the rangefinder laser 341 and rangefinder laser pulses that are reflected back from the target area. The calculation may be made using clock signals generated by the signal processor 424 or by another signal processor to determine the temporal separation.

Specifically according to the present invention, by sharing the large aperture telescopic lens system 390 between the laser target designator module 345 and the laser rangefinder transmitter module 340, the volume footprint of the combined laser target designator and laser rangefinder is reduced in order to reduce the spherical diameter of the payload assembly 110. Moreover, a second benefit is gained by sharing the large aperture telescopic lens system 390 between the laser target designator and the laser rangefinder. Specifically, the large aperture telescopic lens system 390 collects more radiation energy from the target area than can be collected by a smaller aperture telescope, e.g. the small aperture telescopic lens system 342, such that by collecting laser rangefinder beam energy reflected back from the target area with the large aperture telescopic lens system 390 the useful range of the laser rangefinder is increased. According to the invention, the aperture diameter of the large aperture telescopic lens system 390 is selected as required to collimate the target designator beam 425 with a divergence angle that is small enough to illuminate a target of a specific size at a specific maximum range. However, since the large aperture telescopic lens system 390 is used to collect reflected laser rangefinder energy, the maximum range of the laser rangefinder is increased as well.

Secondary Drive.

Referring now to FIG. 6, the secondary video camera 315 and elements of the secondary drive system 400 are shown in exploded isometric view. The secondary drive 400 comprises a pivot bracket 440. The pivot bracket 440 is a solid unitary structural member, such as a metal cast element, having a top arm 445, and a pair of opposing side arms 450, 455 extending substantially orthogonally from the top arm 445.

The top arm 445 includes a mechanical coupling 460 fixedly installed therein such as by a press fit. The mechanical coupling 460 is formed by an annular wall surrounding a longitudinal bore 465. The bore 465 is oriented substantially parallel with the azimuth axis A. A secondary azimuth motor 470 comprises a motor body 475 and a rotatable drive shaft 480 extending out there from. The rotatable drive shaft 480 installs into the bore 465 and is fixedly coupled to the mechanical coupling 460. The motor body 475 is fixedly attached to the optical bench 305. A drive current applied to the secondary azimuth motor 470 causes the rotatable shaft 480 and the pivot bracket 440 to rotate with respect to the optical bench 305. The rotation is about an axis that is substantially parallel with the azimuth axis A. The top arm 442 may include a curved slot 442 with adjustable end stops, such as may be provided by the threaded fasteners 485, for setting rotation end stops.

The side arms 450 and 455 each include a rotary bearing or bushing 490 and 495 fixedly installed therein. Each bearing 490, 495 includes an annular wall surrounding a longitudinal bore 505 and 510. The bores 505 and 510 are oriented coaxially along an axis that is substantially parallel with the elevation axis E when the pivot bracket 440 is at the center of its rotational range. The secondary video camera 315 includes pivot pins 515 and 520 extending out therefrom and fixedly attached thereto for installing into the coaxial bores 505 and 510 to thereby pivotally support the secondary video camera 315 with respect to the pivot arm 440. The rotation is about an axis that is substantially parallel with the elevation axis E when pivot bracket 440 is at the center of its rotational range.

The side arm 450 is formed with a circular mounting flange 525. The flange 525 is configured to support a secondary elevation motor 530. The secondary elevation motor 530 comprises a motor housing 535 and a rotatable drive shaft, not shown, extending out from the motor housing. The rotatable drive shaft installs into a drive gear 545 and is fixedly attached thereto so that rotation of the drive shaft 540 rotates a drive gear 545. The drive gear 545 meshes with a driven gear 550 which is fixedly attached to the pivot pin 515. A drive current applied to the secondary elevation motor 530 causes the elevation motor 530 and its rotatable shaft to rotate the drive gear 545 with respect to the side arm 450. Rotation of the drive gear 545 drives the driven gear 550 which causes the secondary video camera 315 to rotate about an axis that is substantially parallel with the elevation axis E when the pivot bracket 440 is at the center of its rotational range.

The above-described rotations of the secondary video camera 315 allow the secondary pointing axis 332 to be pointed independently from the primary pointing axis 130. Preferably the secondary video camera 315 is rotated over rotation angles approximately limited to plus or minus one half the solid angle fields of view of the secondary video camera 315. More specifically, the secondary drive system 400 is initially assembled and aligned to point the secondary pointing axis 332 substantially coaxial with the pointing direction of the primary pointing axis 130. The secondary drive 400 is configured to rotate the pivot bracket 440 and secondary video camera 315 approximately over plus or minus 20 degrees using the secondary azimuth motor 470 in order to change the azimuth angle of the secondary pointing axis 332 with respect to the azimuth angle of the primary pointing axis 130. The secondary drive system 400 is further configured to rotate the secondary video camera 315 approximately over plus or minus 15 degrees using the secondary elevation motor 530 in order to change the elevation angle of the secondary pointing axis 332 with respect to the elevation angle of the primary pointing axis 130. In addition, each of the secondary azimuth motor 470 and secondary elevation motor 530 includes an angular position resolver included therein or otherwise associated therewith for providing electrical signals in proportion to angular orientation of the secondary video camera 315 or the pointing axis 332.

Referring to FIGS. 4, 9 and 10, a top view of the payload assembly 110 is shown schematically to demonstrate rotation of the primary and secondary cameras about the azimuth axis A. The description is substantially identical for rotation about the elevation axis E except that vertical fields of view may be slightly narrower for each camera. According to the present invention, the primary drive 600 operates to rotate the spherical payload 110 in two axes to rotate the primary pointing axis 130 and every other pointing axis of the payload system simultaneously. Meanwhile, each of the three video cameras is rendering video images with the primary video camera 310 rendering a video image of the primary target area 320 and the second video camera 315 and the third video camera 335 are each rendering a video image of the target area 325. Thus an operator viewing the video image of the secondary target area 325 can detect smaller target areas 320 that may be of interest and direct the primary pointing axis 320 at a selected smaller primary target area 320. Meanwhile, the secondary drive 400 may be operated in a counter slew mode in which the secondary drive system 400 is operated to offset small rotations by the primary drive system 600 by applying equal and opposite rotations to the secondary video camera 315. The equal and opposite rotations cause the secondary pointing axis 332 to remain substantially centered on the secondary target area 325 thereby causing the image of the secondary target area 325 to remain substantially unchanged as the primary camera 310 is rotated to render an image of the selected target area 320. In addition, the optical bench assembly 300 includes gyroscopic stabilizing elements 353, 355 operating in cooperation with the primary drive system 600 to simultaneously stabilize the pointing direction of the primary pointing axis 130.

Figure 11:
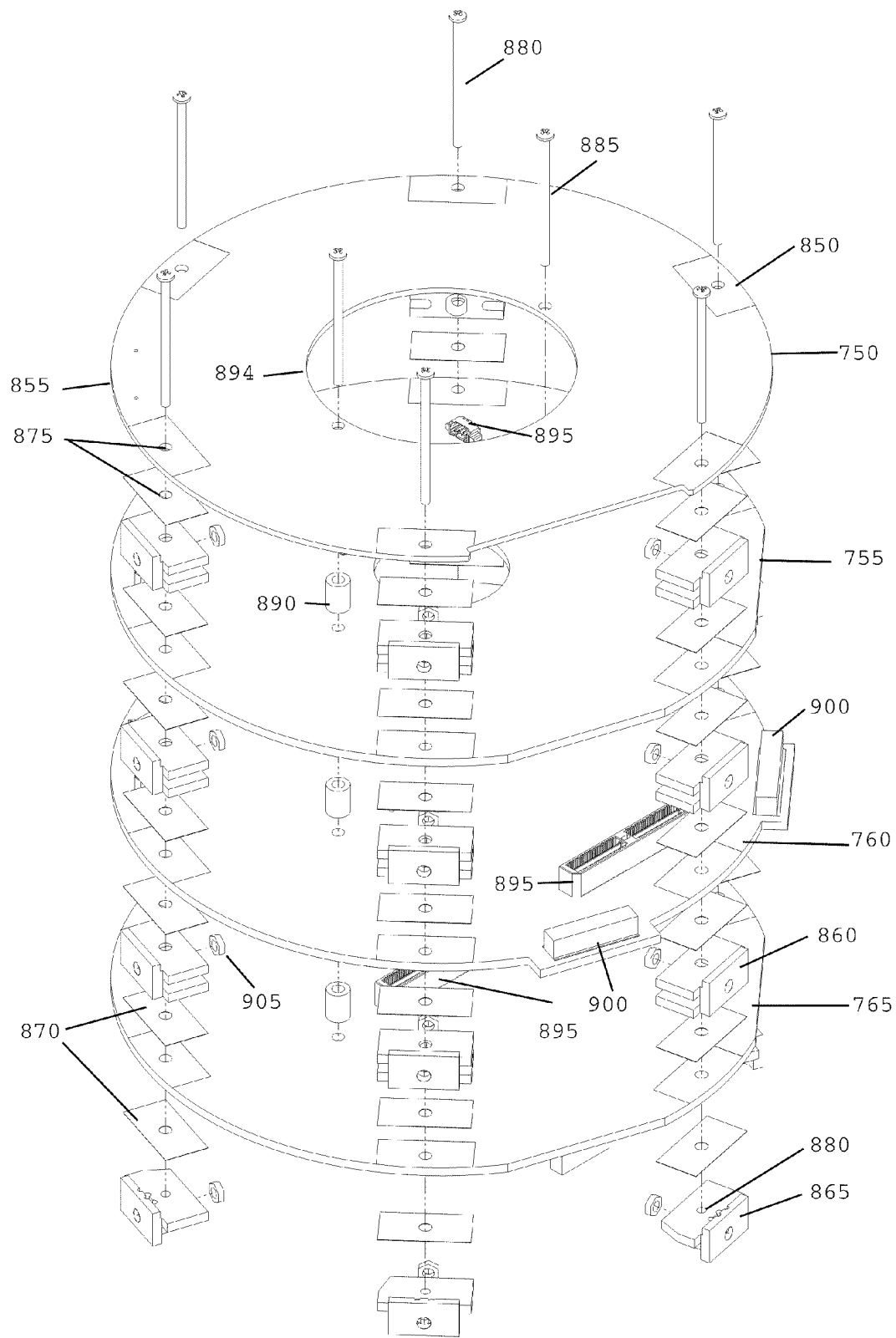
FIG. 11 is an exploded isometric view depicting a plurality of circular PC boards and related mounting elements according to the present invention.
Figure 12:
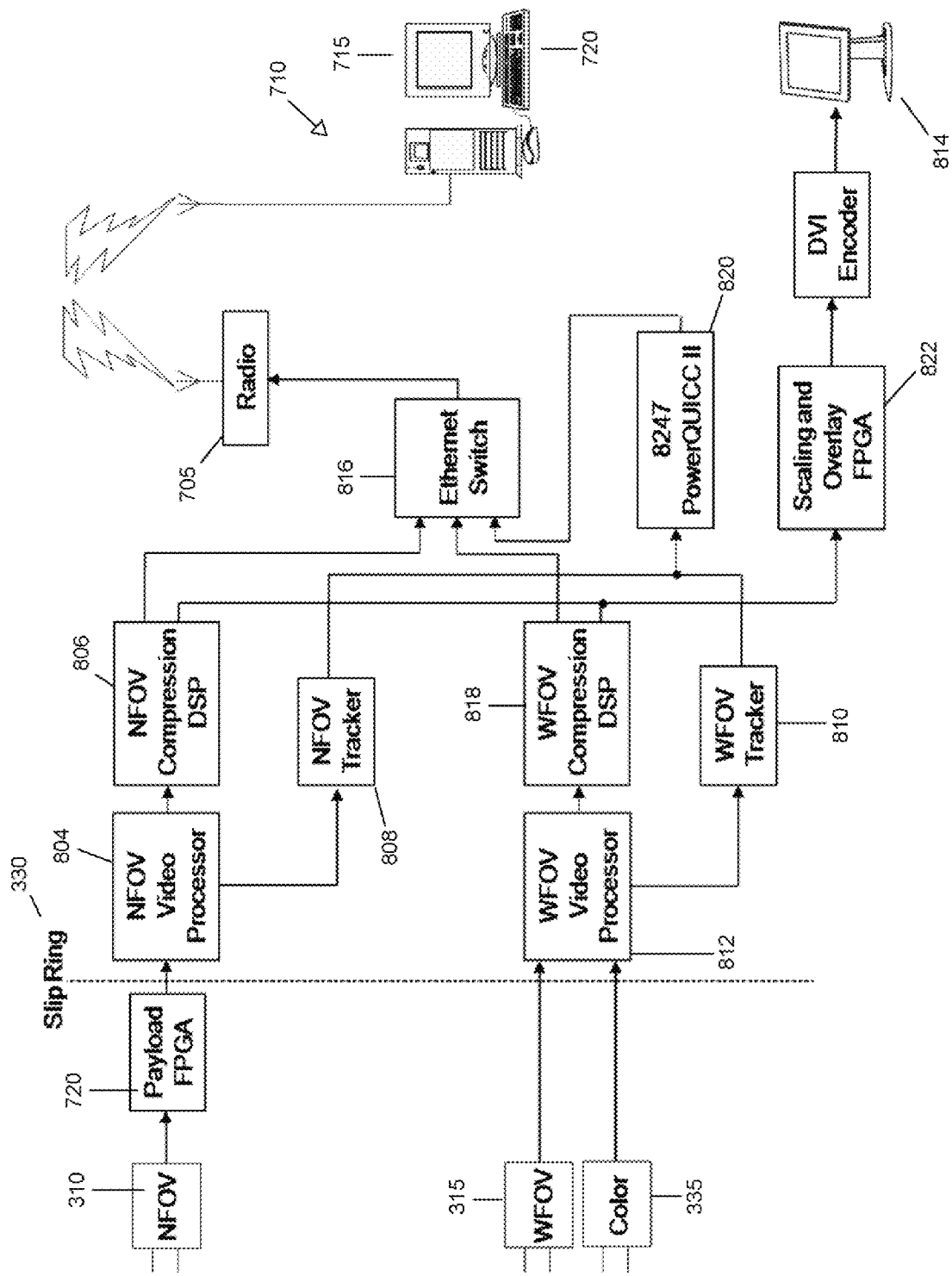
FIG. 12 is a schematic view of video data paths through the optical payload according to the present invention.

Electrical Control System and FIGS. 10-12

Referring now to FIGS. 4, 10-12, and 15A-B, elements of a payload electrical control system 700 are shown in an exploded isometric view in FIGS. 10 and 11 and in schematic views in FIGS. 12 and 15A-B. The electrical control system 700 includes all the electrical systems required to operate the optical payload 100 autonomously and to output video and other signals to a radio 705, carried by the UAV or other support structure 145. The radio 705 broadcasts the output signals to one or more remote radio stations 710 and receives command and control signals from the one or more remote radio stations 710. As shown in FIGS. 12 and 15B, the radio 705 and remote stations 710 operate to exchange command and control signals and the radio 705 delivers appropriate command and control signals to the payload electrical control system 700. In addition, each remote radio station 710 may include a video display device 715 and user interface controls 721 operable to view live video images received from the optical payload 100 and specifically to view images from two of the three payload cameras 310, 315 and 335 simultaneously. In addition, a user operating the interface controls 721 can command the optical payload 100 remotely to point either of the pointing axes 130 or 332 at a target area 325 or a selected target 320 and to select which two live camera images to receive from the payload assembly and display on the video display device.

The electrical system 700 is configured to continuously operate the primary video camera 310 and to continuously deliver images rendered by the primary video camera 310 to the radio 705 a wireless network protocol such as wireless Ethernet. Moreover, the images rendered by the primary video camera are network packeted for delivery to a first network IP address associated with which ever remote radio station 710 is sending command and control signals to the optical payload and more specifically the first IP address is exclusively associated with the primary video images.

The electrical system 700 includes a switch or multiplexer, not shown, mounted on the optical payload controller 720. The switch or multiplexer is in communication with each of the secondary video camera 315 and the tertiary video camera 335. Using the multiplexer, a user at the remote radio station 710 can command the optical payload to operate and transmit video images rendered by either the secondary or tertiary video camera but not both. Once one of the secondary or tertiary cameras is selected, the selected camera is operated and the system 700 is configured to operate the selected video camera 315 or 335 and to continuously deliver images rendered by the secondary video camera 315 or 335 to the radio 705 using a wireless network protocol such as wireless Ethernet. Moreover, the images rendered by the selected video camera 315 or 335 are network packeted for delivery to a second network IP address associated with whichever remote radio station 710 is sending command and control signals to the optical payload and more specifically the second IP address is exclusively associated with the video images of the selected camera.

The electrical system 700 is further configured to track video targets in both video images being transmitted to the remote radio station 710, to determine target ranges, target geo-locations, target temperatures and other data about the target area as may be required and to generate target meta data. The target meta data may comprise video overlays such as a cursor text box and or graphical data display that is updated in each video frame. Accordingly, the electrical system 700 is further configured to network packetize the target meta data for delivery to a third network IP address associated with whichever remote radio station 710 is sending command and control signals to the optical payload. Specifically the third IP address may be used as the IP address for all target meta data as well as any command and control signals that are exchanged between the optical payload and remote radio station 710 is sending command and control signals to the optical payload.

Generally, the electrical system 700 includes various digital processors configured or programmed for video image signal processing as may be required to correct the video signals, to make signal value offsets and gain adjustments for reducing signal noise, to adjust brightness and contrast to desired levels, to replace dead pixels with data values predicted from surrounding pixel data values, and to enhance image detail such as by sharpening edges or the like. In addition, the video image rendered by each camera is scaled to a desired display format size prior to transmission or at the remote radio station. In the preferred embodiment, target meta data in the form of text and graphics overlay data is not combined with the video image data in the payload but sent to the third IP address at remote station for remote combination with the video images. However, the meta data can be combined with the video images by the electrical system 700. In addition, the electrical control system 700 operates to compress the video data of the primary video image and the selected video image and to merge the two compressed images into a single wireless network packeted data stream.

The electrical system 700 further includes an Ethernet switch 816, which operates cooperatively with a communication processor 820 and the radio 705. The communications processor 820 configures and routes network data packets exiting the payload to the intended IP address as well as receives incoming network data packets and routes the data to a master controller PC board 760, described below.

The electrical system 700 further operates the primary drive system 600 in a manner that directs the primary pointing axis 130 at a target area 325 and at selected targets 320 and steers the primary pointing axis 130 in order to keep the target area within the field of view of the primary video camera 310 even as the optical payload 100 is being carried by a moving aircraft or vehicle. In addition, the electrical system 700 includes gyro stabilizing elements 353 and 355, housed inside the spherical payload assembly 110, for providing gyro stabilizing signals usable to stabilize the pointing direction of the primary pointing axis 130.

The electrical system 700 further operates the secondary drive system 400 in a manner that directs the secondary pointing axis 332 at a target area and steers the secondary pointing axis 332 in order keep the target area within the field of view of the secondary video camera 315 even as the primary pointing axis is being actively pointed by the primary drive system 600.

As shown in FIGS. 10 and 11, the electrical control system 700 comprises a plurality of interconnected electrical sub modules, and individual electrical components disposed within the spherical payload assembly 110 and or within the yoke assembly 105. The electrical control system 700 can be mechanically divided into two portions, namely electrical sub systems housed within the spherical payload assembly 110 and electrical sub systems housed within the yoke assembly 105. The two portions are electrically interconnected by a conventional slip ring assembly 330. The slip ring assembly 330 is included as a component of the elevation drive and rotary joint 140 and provides opposing conductive rings with one fixed to the yoke assembly and the other rotating with the spherical payload. The rings remain in electrical contact with each other as the elevation drive and rotary joint 140 is rotated and provide an uninterrupted electrical interconnection between elements housed inside the spherical payload assembly 110 and elements housed inside the yoke assembly 105. In addition, the elements inside the yoke assembly 105 are in communication with the radio transceiver 705 which is carried by the UAV or other support structure 145.

Referring to FIG. 10, the electrical subsystems housed inside the spherical payload assembly 110 include a payload controller 720; a secondary drive system controller 725, and additional electrical components and or sub systems that are associated with the three video cameras 310, 315, 335, and with the laser target designator and laser rangefinder systems. The payload controller 720 interfaces with all of the electrical components and sub systems housed inside the spherical payload assembly 110 to control the operation of the spherical payload assembly 110 and communicate with electrical subsystems not housed inside the payload assembly 110 through the slip ring assembly 330. In particular, payload controller 720 includes a first microprocessor for controlling the primary camera and for reading out video data from the primary focal plane array. The payload controller 720 also controls operations of and data processing and communication related to the laser target designator module 345 and laser rangefinder transmitter module 340.

Referring to FIGS. 10 and 11, the electrical subsystems housed inside the yoke assembly 105 included four circular PCB's 750, 755, 760, 765 configured to fit within the electronics cavity 160 stacked one above another and electrically and mechanically interconnected. In addition, the electrical subsystems housed inside the yoke assembly 105 include a plurality of power supplies 730 disposed around the upper bracket 165 and a power supply 735 disposed in the yoke arm 215. The electrical subsystems housed inside the yoke assembly 105 also include an azimuth motor driver 740 which is disposed inside the electrical cavity 160 attached to the thin annular wall 155 proximate to the upper bracket 165 and an elevation motor driver 745 disposed in the yoke arm 210.

The four circular PCB's include a primary servo controller 750, for controlling the pointing direction of the primary pointing axis 130, a video encoder 755, for compressing video data from all three camera systems, a master controller 760, for receiving video data from all three camera systems and communicating the video data from two images at a time to an Ethernet switch 816 and associated communication processor 820, and a dual channel tracker 765, which includes a primary channel for tracking the primary pointing axis 130 and a secondary channel for tracking the secondary pointing axis 332.

The payload controller 720 includes a commercially available field programmable gate array (FPGA), not shown, e.g. manufactured by XILINIX Inc. of San Jose Calif., USA. In addition, the payload controller 720 includes a digital microprocessor, e.g. a Power PC 405, memory components, at least comprising short term memory registers, a clock signal or timing generator, and other components as may be required to perform operations according to program steps operating on the FPGA. The payload controller 720 further includes additional non-volatile memory devices such as flash memory and electrically erasable programmable memory (EEPROM) for storing the program steps and other data which may be loaded into the FPGA on power up and used to manage the operation of elements housed inside the spherical payload assembly 110 and to exchange data and commands with the master controller 760 through the slip ring assembly 330. The payload controller 705 further includes a universal asynchronous receiver/transmitter (UART) used to serialize data exchanged between the payload controller 720 and the master controller 760, as well as other input and output serial communication channels such as a joint test action group JTAG connector interfaced with the Power PC 405 for outputting test and raw data to a test device 814, and a state machine operating on the FPGA for controlling each of the laser target designator module 345 and laser rangefinder transmitter module 340.

The payload controller 720 operates to generate clock signals which are communicated to the primary camera 310 in order to initiate readouts of primary focal plane array according to a frame rate. The second and third cameras 315 and 335 include clock signal generators and readout electronics within the camera systems. The primary video camera 310 and third video camera 335 are operated with a frame rate of approximately 60 Hz and the secondary video camera 315 is operated with a frame rate of approximately 30 Hz. Video data from the video camera 310 is read out and serialized by the payload controller FPGA before being sent to the master controller 760 in RS 422 format.

The payload controller 720 further operates to exchange commands and state data with each of the three video cameras 310, 315, 335. The commands and state data may comprise on/off commands, camera system mode or state change commands, camera system status updates, and other conditions of the camera systems such as temperature, power usage, illumination levels, etc. In addition, the payload controller 720 communicates with the IDCA 370 and the telescope 350 to control and monitor their operating states.

Referring to FIGS. 12 and 15A-B, the flow of video data through the payload electrical control system 700 is shown in schematic view. Starting with the primary video camera 310 video, primary camera data frames are read out directly to the payload controller 720 which serializes the primary data frames and delivers them to the master controller 760 over a first video channel 761. The master controller 760 includes a first digital processor 804 such as a field programmable gate array, (FPGA) that receives the serialized primary data frames from the payload controller 720 and makes offset/gain and dead pixel replacement corrections and then outputs the corrected serialized primary data frames to the video encoder PC board 755 for data compression and to the tracker PC board 765 for tracking and meta data generation. The video encoder PC board 755 includes a third digital processor such as a digital signal processor, (DSP) or application specific integrated circuit (ASIC) 806 mounted thereon. The third digital processor 806 compresses the corrected serialized primary data frames and delivers compressed corrected primary data frames to the Ethernet switch 816 which operates in cooperation with the specialized communications processor 820 to packetize the primary data frames with each data packet being addressed to the first IP address associated with the remote station 710 before communicating packetized data to the radio transceiver 705. Alternately, the FPGA 804 may communicate uncompressed video data directly to the Ethernet switch 816 e.g. by disabling video data compression programs running on the third digital process 806. A second output channel from the FPGA 804 delivers the serialized primary data frames to a primary tracker 808 mounted on the dual channel tracker PC board 765. The primary tracker 808 generates tracking meta data related to the primary data frames and delivers the primary tracking meta data to the communications process 820 which packetizes the primary tracking meta data with each data packet being addressed to the third IP address associated with the remote station 710 before communicating packetized primary tracking meta data to the radio transceiver 705.

With respect to the secondary video camera 315 and the tertiary video camera 335, data frames from the selected camera 315 or 335 are passed through multiplexor mounted on the payload controller 720 to the master controller 760 which includes a second digital processor 812 such as an FPGA that receives the serialized data frames from the payload controller 720 and, if necessary, makes video corrections and then outputs corrected serialized secondary data frames to the video encoder PC board 755 for data compression and to the tracker PC board 765 for tracking and meta data generation. The video encoder PC board includes a fourth digital processor 818, such as a DSP or ASIC, mounted on the video encoder PC board 755. The fourth digital processor 818 compresses the corrected serialized data frames of the selected camera and delivers the compressed data frames from the selected camera to the Ethernet switch 816, which operates in cooperation with a specialized communications processor 820 to packetize the selected camera data frames with each selected camera data packet being addressed to the second IP address associated with the remote station 710 before communicating packetized data to the radio transceiver 705. Alternately, the FPGA 812 may communicate uncompressed video data directly to the Ethernet switch 816 e.g. by disabling video data compression programs running on the fourth digital processor 818. A second output channel from the second digital process 818 delivers the serialized secondary data frames to a secondary tracker 810 mounted on the dual channel tracker PC board 765. The secondary tracker 810 generates tracking meta data related to the data frames of the selected video camera and delivers the secondary tracking meta data to the communications process 820 which packetizes the secondary tracking meta data with each data packet being addressed to the third IP address associated with the remote station 710 before communicating packetized primary tracking meta data to the radio transceiver 705.

While the master controller PC board 760 described above includes first and second digital signal processor 804 and 812 for separately processing two separate video images, a preferred embodiment utilizes a single digital video image processor 805 configured to receive video image data from the primary video camera 310 and the selected video camera 315 and 335 and to operate in a multiplex mode to process both the primary video image and the selected video image and to deliver the primary video data to the third digital processor 806 for compression and the primary tracker 808 for tracking and to deliver the selected video image to the fourth digital processor 818 for compression and to the secondary tracker 810 for tracking.

Accordingly, when the primary and secondary video cameras are selected for viewing the Ethernet switch 816 in cooperation with the communications process 820 merges the primary video image addressed to the first IP address, the secondary video image, from the second video camera 315 addressed to the second IP address, and the tracking meta data addressed to the third IP address into a single packetized network data stream such that the payload system 100 simultaneously communicates two display formatted video images and a meta data file to the radio 705 for transmission to the remote station 710 associated with the first second and third IP addresses.

Similarly, when the primary and tertiary video camera are selected for viewing the Ethernet switch 816 in cooperation with the communications process 820 merges the primary video image, addressed to the first IP address, the tertiary video image from the third video camera 335, addressed to the second IP address, and the tracking meta data addressed to the third IP address into a single packetized network data stream such that the payload system 100 simultaneously communicates two display formatted video images and a meta data file to the radio 705 for transmission to the remote station 710 associated with the first, second, and third IP addresses.

Preferably, the network packetized data stream is configured with a wireless Ethernet network protocol, however, any other wireless protocol suitable for transmission over the onboard radio 705 is usable without deviating from the present invention. In addition, each of the DSP's 806 and 818 delivers compressed video data to a scaling and overlay processor 822 operating on the master controller 760. The scaling and overlay processor 822 prepares the video data for local display, e.g. when the UAV is on the ground and or being used in evaluation in test mode e.g. on the test station 814. Alternately, uncompressed video can be delivered to the local display.

The communication processor 820 may include a specialized data communications processor such as a MPC8247: Power QUICC II Integrated Communication Process manufactured by Freescale Semiconductor of Austin Tex., USA. The data communications processor combines a core digital data processor, such as a PowerPC 603, and a RISC based communication processor with internal memory elements, a clock signal generator, and various interface and control modules and is programmed to operate in cooperation with the Ethernet switch 816 or another network switch. Each of the video compression DSP's 806 and 818 communicates video data to the Ethernet switch 816 and each of the trackers 808 and 810 communicates tracking meta data to the communication processor 820 and the data from both sources is merged in the network packetized data stream described above. In an alternate embodiment, a fourth IP address can be used to deliver tracking meta data associated with each of the video images to separate a IP address.

Referring now to FIG. 11, the circular PC boards 750, 755, 760 and 765 are shown in exploded view with electrical and mechanical interface hardware shown in detail. Each circular PC board has an outsider diameter defined by a circular peripheral edge 855 and opposing top and bottom opposing surfaces. The outside diameter is sized to substantially fill the inside diameter of the thin annular wall 155 and the circular PC boards are assembled together as a stack and installed into the hollow electrical cavity 160 with the top and bottom surfaces of each PC board substantially normal to the azimuth axis A.

Each circular PC board includes a plurality of thermally conductive pads 850, such as an exposed copper layer of the PC board, disposed equally spaced around its peripheral edge 855 on top and bottom surfaces thereof. More specifically each PC board includes an internal layer of copper or other thermally conductive material substantially over its entire area and the conductive pads 850 are exposed portions of the conductive internal layer. A plurality mounting blocks 860 are disposed between opposing PC boards at locations corresponding with the conductive pad 850. In addition, a plurality of bottom mounting blocks 865 are disposed at locations corresponding with conductive pads 850 formed on the bottom surface of the bottom PC board 765. Each mounting block comprises a thermally conductive material or otherwise provides a thermally conductive path through the mounting block. In addition, a plurality of thermally conductive and electrically insulating spacers may be disposed between the conductive pads 850 and the mounting blocks 860 and 865 between the PC boards and the mounting blocks.

Each mounting block 860 as well as each conductive pad 850 and each spacer 870 includes a through hole 875 passing through the block, conductive pad or spacer. The through holes are substantially parallel with the azimuth axis A, or longitudinal, and a plurality of longitudinal mounting screws 880, one corresponding with each conductive pad location, installs through the aligned holes 875 and engages with a threaded hole 880 formed in each bottom mounting block 865 such that the longitudinal mounting screws 880 align the PC boards with the mounting blocks 860 and 865 and providing a longitudinal clamping force that claims the PC boards between opposing mounting blocks into a stack separated by mounting blocks 860 and spacers 870 so that a substantially continuous thermally conductive path extends longitudinally along each longitudinal mounting screw 880 to allow thermal energy to be conducted between PC boards to prevent local overheating. In addition some of the PC boards may include a center through hole defined by an inner diameter 894 as may be required to avoid contact with other elements such as components of the azimuth drive and other longitudinal mounting screws 885 may pass through the PC boards and through hollow spacers 890 disposed between PC boards to further secure the PC boards in place and increase mechanical stiffness of the PC board stack.

In addition to assembling the plurality of PC boards 750, 755, 760, 765 into a stack using mounting longitudinal screws 880 and 885, the PC boards are electrically interconnected with each other using a plurality of multi-pin connectors 895 and electrically connected with other electrical systems using one or more edge connectors 900. Thereafter, the entire stack may be lowered into the hollow electrical cavity 160 and a plurality of threaded nuts 905 disposed to mate with each of the mounting blocks 860 and 865 are aligned with corresponding through holes 910, shown in FIG. 10, formed to pass through the thin annular wall 155 such that mounting screws, not shown, can be installed through each hole 910 and each mounting block 860 and 865 to engage with each threaded nuts 905 to support the stack of PC boards 750, 755, 760, 765 inside the hollow electrical cavity 160.

According to the present invention, thermal energy generated by each of the PC boards 750, 755, 760, 765 is thermally conducted by the conductive internal layer along radial paths to each of the conductive pads 850 to each of the mounting blocks 860/865 and then to the thin annular wall 155 which is exposed to external airflow. The excess thermal energy is then dissipated by the convective and radiant heat transfer between the thin annular wall 155 and the external airflow.

It will also be recognized by those skilled in the art that, while the invention has been described above in terms of preferred embodiments, it is not limited thereto. Various features and aspects of the above-described invention may be used individually or jointly. Further, although the invention has been described in the context of its implementation in a particular environment, and for particular applications, those skilled in the art will recognize that its usefulness is not limited thereto and that the present invention can be beneficially utilized in any number of environments and implementations including but not limited to payload systems that include fewer or more electro-optical systems or combinations thereof. Accordingly, the claims set forth below should be construed in view of the full breadth and spirit of the invention as disclosed herein.

We claim:

1. An optical payload, comprising:
    a laser rangefinder transmitter module comprising a rangefinder laser configured to emit a pulsed laser rangefinder beam and a small aperture telescopic lens system configured to substantially collimate and point the laser rangefinder beam at a target area;
    a laser target designator module comprising a designator laser configured to emit a pulsed laser target designator beam, a large aperture telescopic lens system configured to substantially collimate and point the designator beam at the target area, a laser rangefinder receiver module, first optical elements disposed along a first optical path between the large aperture telescopic lens system and the designator laser configured to direct the pulsed laser target designator beam from the designator laser to the large aperture telescopic lens system; and,
    second optical elements disposed along a second optical path between the large aperture telescopic lens system and the laser rangefinder receiver module configured to direct energy of the pulsed laser rangefinder beam that is reflected by the target area and collected by the large aperture telescopic lens system onto the laser rangefinder receiver module;
    wherein both the first optical elements and the second optical elements include a beam splitter, wherein the beam splitter and the first and second optical elements are configured to direct the laser target designator beam from the laser target designator module to the large aperture telescopic lens system and to direct the energy of the pulsed laser rangefinder beam that is reflected by the target area and collected by the large aperture telescopic lens system to the laser rangefinder receiver module, and wherein the beam splitter comprises a dichroic filter configured with a maximum spectral transmission substantially matched with a spectral emission of the designator laser and further configured with a maximum spectral reflectance substantially matched with the spectral emission of the rangefinder laser.

2. The optical payload of claim 1 wherein the rangefinder laser has a spectral output in the range of 1500 to 1800 nanometers.

3. The optical payload of claim 2 wherein the rangefinder laser has a spectral output substantially centered at 1535 nanometers.

4. The optical payload of claim 3 wherein the rangefinder laser comprises an Erbium glass rod pumped by one or more pumping sources.

5. The optical payload of claim 4 wherein the rangefinder laser is configured to generate laser pulses having pulse durations ranging from 5 to 25 nanoseconds with pulse energies ranging from 2 to 8 mJ.

6. The optical payload of claim 1 wherein the designator laser has a spectral output substantially centered at 1064 nanometers.

7. The optical payload of claim 6 wherein the designator laser comprises a neodymium-doped yttrium aluminum garnet laser crystal pumped by one or more pumping sources.

8. The optical payload of claim 7 wherein the designator laser is configured to generate laser pulses having a minimum pulse duration of 10 nanoseconds and a minimum pulse energy of 30 mJ.

9. The optical payload of claim 8 wherein the designator laser is modulated to emit laser pulses at a frequency ranging from 8 to 20 pulses per second.

10. The optical payload of claim 1 wherein the laser rangefinder transmitter module and the laser target designator module are mechanically independent modules.

11. The optical payload of claim 1 wherein the beam splitter is configured to transmit the laser target designator beam and to reflect the energy of the pulsed laser rangefinder beam that is reflected by the target area.

12. The optical payload of claim 11 wherein the first optical elements further comprise two mirrors disposed between the beam splitter and the large aperture telescopic lens system.

13. The optical payload of claim 11 wherein the second optical elements further comprise a mirror and a focusing lens set for focusing the energy of the pulsed laser rangefinder beam that is reflected by the target area onto an active area of the laser rangefinder receiver module.

14. The optical payload of claim 1 further comprising a fiber optic element extending between the laser rangefinder transmitter module and the laser designator module for directing at least a portion of the energy of each pulse of the laser rangefinder beam onto an active area of the laser rangefinder receiver module.

15. The optical payload of claim 14 further comprising a signal processor in communication with the laser rangefinder receiver module for processing photo current signals generated thereby.

16. A method for operating an optical payload, the method comprising:
 emitting a pulsed laser rangefinder beam from a laser rangefinder transmitter module;
 collimating the pulsed laser rangefinder beam and directing the collimated pulsed laser rangefinder beam onto a target area using a small aperture telescopic lens system attached to the laser rangefinder transmitter module;
 collecting energy of the collimated pulsed laser rangefinder beam that is reflected by the target area using a large aperture telescopic lens system and directing energy collected thereby onto a laser rangefinder receiver module;
 emitting a pulsed laser target designator beam from a designator laser housed within a laser target designator module;
 collimating the laser target designator beam and directing the collimated laser target designator beam onto the target area using the large aperture telescopic lens system;
 coupling energy from the laser rangefinder beam into a first end of a fiber optic element and directing a second end of the fiber optic element onto an active area of the laser rangefinder receiver module to generate a first photocurrent in response to laser rangefinder beam pulses;
 generating a second photocurrent response to the laser rangefinder beam energy that is reflected by the target area and collected by the large aperture telescopic optical system;
 communicating each of the first and second photocurrent responses to a signal processor;
 calculating a range from the payload to the target area according to a temporal separation between the first and second photocurrent responses;
 wherein the large aperture telescopic lens system and laser rangefinder receiver module are housed in the laser target designator module; and,
 wherein the laser rangefinder transmitter module and the laser target designator module are mechanically independent modules.

17. The method of claim 16, further comprising:
 capturing first images, with a narrow field of view, at a first infrared wavelength range of the target area;
 capturing second images, with a wide field of view, at a second infrared wavelength range of the target area, wherein the first and second infrared wavelength ranges are substantially different, and wherein the narrow field of view and the wide field of view may be independently pointed to the target area; and
 capturing third images at a visible wavelength range of the target area.

18. The method of claim 16, wherein the directing the energy onto the laser rangefinder receiver module and the directing the collimated laser target designator beam comprises using a dichroic filter configured with a maximum spectral transmission substantially matched with a spectral emission of the designator laser and further configured with a maximum spectral reflectance substantially matched with the spectral emission of the pulsed laser rangefinder beam.

19. An optical payload, comprising:
 a laser rangefinder transmitter module comprising a rangefinder laser configured to emit a pulsed laser rangefinder beam and a small aperture telescopic lens system configured to substantially collimate and point the laser rangefinder beam at a target area;
 a laser target designator module comprising a designator laser configured to emit a pulsed laser target designator beam, a large aperture telescopic lens system configured to substantially collimate and point the designator beam at the target area, a laser rangefinder receiver module, first optical elements disposed along a first optical path between the large aperture telescopic lens system and the designator laser configured to direct the pulsed laser target designator beam from the designator laser to the large aperture telescopic lens system;
 second optical elements disposed along a second optical path between the large aperture telescopic lens system and the laser rangefinder receiver module configured to direct energy of the pulsed laser rangefinder beam that is reflected by the target area and collected by the large aperture telescopic lens system onto the laser rangefinder receiver module; and a fiber optic element extending between the laser rangefinder transmitter module and the laser designator module configured to direct at least a portion of the energy of each pulse of the laser rangefinder beam onto an active area of the laser rangefinder receiver module.

20. The optical payload of claim 19, further comprising:

a signal processor in communication with the laser rangefinder receiver module and configured to determine a range from the optical payload to the target area based on the energy directed by the fiber optic element to the laser rangefinder receiver module; and a beam splitter, wherein the beam splitter and the first and second optical elements are configured to direct the laser target designator beam from the laser target designator module to the large aperture telescopic lens system and to direct the energy of the pulsed laser rangefinder beam that is reflected by the target area and collected by the large aperture telescopic lens system to the laser rangefinder receiver module, and wherein the beam splitter comprises a dichroic filter configured with a maximum spectral transmission substantially matched with a spectral emission of the designator laser and further configured with a maximum spectral reflectance substantially matched with the spectral emission of the rangefinder laser.

21. The optical payload of claim 20, wherein the rangefinder laser comprises an Erbium glass rod having a spectral output in the range of 1500 to 1800 nanometers, wherein the designator laser comprises a neodymium-doped yttrium aluminum garnet laser crystal having a spectral output substantially centered at 1064 nanometers, and wherein the laser rangefinder transmitter module and the laser target designator module are mechanically independent modules.

* * * * *